US012482145B2

(12) United States Patent
Holland

(10) Patent No.: US 12,482,145 B2
(45) Date of Patent: Nov. 25, 2025

(54) REMOTE LANDMARK RENDERING FOR EXTENDED REALITY INTERFACES

(71) Applicant: QUALCOMM Incorporated, San Diego, CA (US)

(72) Inventor: Wesley James Holland, Encinitas, CA (US)

(73) Assignee: QUALCOMM Incorporated, San Diego, CA (US)

(*) Notice: Subject to any disclaimer, the term of this patent is extended or adjusted under 35 U.S.C. 154(b) by 670 days.

(21) Appl. No.: 17/377,122

(22) Filed: Jul. 15, 2021

(65) Prior Publication Data

US 2023/0013539 A1 Jan. 19, 2023

(51) Int. Cl.
| G06T 11/00 | (2006.01) |
| G06F 3/041 | (2006.01) |
| G06K 7/14 | (2006.01) |
| G06T 7/73 | (2017.01) |

(52) U.S. Cl.
CPC ............ *G06T 11/00* (2013.01); *G06K 7/1417* (2013.01); *G06K 7/1443* (2013.01); *G06T 7/73* (2017.01); *G06F 3/041* (2013.01)

(58) Field of Classification Search
CPC ......... G06T 11/00; G06T 7/73; G06K 7/1417; G06K 7/1443; G06F 3/041
See application file for complete search history.

(56) References Cited

U.S. PATENT DOCUMENTS 8,497,841 B1* 7/2013 Sze .................... G06F 3/0416
345/158
2015/0212918 A1 7/2015 Cai et al.
2016/0109937 A1 4/2016 Kim et al.
2016/0267712 A1 9/2016 Nartker et al.
2017/0061700 A1 3/2017 Urbach et al.
(Continued)

FOREIGN PATENT DOCUMENTS

CN 104423583 A 3/2015
CN 107407965 A 11/2017
(Continued)

OTHER PUBLICATIONS

International Search Report and Written Opinion—PCT/US2022/035940—ISA/EPO—Oct. 12, 2022.

*Primary Examiner* — Grace Q Li
(74) *Attorney, Agent, or Firm* — QUALCOMM Incorporated

(57) ABSTRACT

Systems and techniques are described for providing a virtual interface for an XR device using a display interface device. A display interface device can display a landmark pattern, such as a quick response (QR) code, on its display. The display can be in the field of view of a camera of the XR device, so that camera captures images depicting the displayed landmark pattern. The XR device can generate, and display on its own display, output images based on the captured images, for instance by overlaying a virtual interface over the landmark pattern. The pose and/or size of the virtual interface in the output images can be based on the pose and/or size of the landmark pattern and/or display in the captured images. The display interface device can receive inputs through its display interface, such as touch-based inputs, which the display interface device can identify for the XR device.

30 Claims, 12 Drawing Sheets

(56) References Cited

U.S. PATENT DOCUMENTS

| | | |
|---|---|---|
| 2017/0076502 A1 | 3/2017 | Chen et al. |
| 2017/0097806 A1 | 4/2017 | Joshi |
| 2017/0307889 A1 | 10/2017 | Newman |
| 2017/0308258 A1 | 10/2017 | Xu et al. |
| 2017/0364960 A1 | 12/2017 | Huang |
| 2018/0095542 A1 | 4/2018 | Mallinson |
| 2018/0095708 A1 | 4/2018 | Black et al. |
| 2018/0160105 A1 | 6/2018 | Ross et al. |
| 2019/0037166 A1 | 1/2019 | Davis et al. |
| 2019/0065026 A1 | 2/2019 | Kiemele et al. |
| 2019/0304477 A1 | 10/2019 | Wojcieszak et al. |
| 2019/0318501 A1 | 10/2019 | Balan et al. |
| 2020/0089313 A1 | 3/2020 | Himane |
| 2020/0316462 A1 | 10/2020 | Raghoebardajal et al. |
| 2021/0034222 A1 | 2/2021 | Brems et al. |
| 2022/0044506 A1* | 2/2022 | Dewey .................. G07C 9/215 |

FOREIGN PATENT DOCUMENTS

| | | |
|---|---|---|
| EP | 3236423 A1 | 10/2017 |
| JP | 2018534643 A | 11/2018 |
| JP | 2019105678 A | 6/2019 |
| JP | 2019522831 A | 8/2019 |
| KR | 20180044687 A | 5/2018 |
| TW | 201443760 A | 11/2014 |
| WO | 2014188798 A1 | 11/2014 |
| WO | 2016144560 A1 | 9/2016 |
| WO | 2019051495 A1 | 3/2019 |

* cited by examiner ics. For example, aspects of the present disclosure include
REMOTE LANDMARK RENDERING FOR EXTENDED REALITY INTERFACES

FIELD

The present disclosure generally relates to image processing. For example, aspects of the present disclosure include systems and techniques for providing a virtual touch-based interface in extended reality (XR).

BACKGROUND

An extended reality (XR) device is a device that displays an environment to a user, for example through a head-mounted display (HMD), glasses, a mobile handset, or other device. The environment is at least partially different from the real-world environment in which the user is located. The user can generally change their view of the environment interactively, for example by tilting or moving the HMD (e.g., by moving the user's head, etc.) or other device. Virtual reality (VR), augmented reality (AR), and mixed reality (MR) are examples of XR.

In some use cases of XR, it is useful to receive inputs from a user, for instance to control virtual objects or to adjust settings of the XR device itself. For example, in XR-based video gaming, a user may use inputs to control a virtual character. A user may also use inputs to adjust a volume level, control playback of a song or video, and the like. Traditional video game controllers can be imprecise for certain types of inputs, such as fine scrolling or sliding adjustments, and can be bulky and inconvenient for users to carry. Mid-air gestures can be imprecise due to lack of tactile feedback and reliance on hand tracking, which can be inconsistent.

Display interface devices with display-based interfaces are commonly used by users, including for instance mobile handsets, tablet devices, laptop computers, televisions, and smart watches. A display interface device with a display-based interface can include, for example, a touchscreen device with a touchscreen interface that can display an interface on the touchscreen and receive inputs through the touchscreen. Display interface devices with display-based interfaces can also include devices that use a cursor, a trackpad, a keypad, a controller, a remote control, and the like, to interact with a displayed interface. Display interface devices with display-based interfaces can receive precise and tactile inputs, allowing users to interact with a displayed interface.

BRIEF SUMMARY

In some examples, systems and techniques are described for providing a virtual interface for an XR device using one or more display devices. The XR device can use one or more cameras to capture one or more images of a real-world scene in the field of view of the one or more cameras. A display interface device can be configured to display a recognizable landmark pattern (e.g., a quick response (QR) code or other landmark pattern) on its display. The display interface device can be in the field of view of the one or more cameras of the XR device while the display interface device displays the landmark pattern, so that the one or more images captured by the cameras of the XR device depict the display interface device displaying the landmark pattern. The XR device can generate one or more output images based on the one or more captured images. The XR device overlays a virtual interface over the landmark pattern in the one or more output images. Overlaying the virtual interface over the landmark pattern and/or replacing a landmark pattern with the virtual interface can ensure that the virtual interface appears clear and sharp as displayed by the XR device to the user, and can allow the user to provide precise inputs with feedback (e.g., visual feedback, tactile feedback, audible feedback, vibrational feedback, or a combination thereof). In some examples, the virtual interface is a touch-based virtual interface and the one or more display interface devices are one or more touchscreen devices. A touchscreen device can receive one or more touch inputs through the touchscreen. A display interface device can send display interface input identifiers for the display interface inputs to the XR device. The display interface input identifiers can identify coordinates on the display and/or display interface of the display interface device of each of the one or more display interface inputs (e.g., coordinates of touch inputs, mouse clicks, and the like). The XR device and/or display interface device can identify, based on the landmark pattern and the touch input identifiers, whether the display interface inputs align with, and thus interact with, any interface elements of the virtual interface. The XR device and/or display interface device can update the virtual interface based on the display interface inputs having aligned with and/or interacted with one or more interface elements of the virtual interface. The XR device can display or update virtual content in the field of view of the XR device in response to touch inputs interacting with one or more interface elements of the virtual interface. The XR device can play or update audio content and/or play or update visual content and/or output a vibration in response to display interface inputs aligning with and/or interacting with one or more interface elements of the virtual interface.

In one example, an apparatus for image processing is provided. The apparatus includes a memory and one or more processors (e.g., implemented in circuitry) coupled to the memory. The one or more processors are configured to and can: receive an input image of a scene, the input image captured by an image sensor; detect, in the input image of the scene, a landmark pattern displayed on a first display in the scene; determine a pose of the landmark pattern in the input image; and cause a second display to display an output image that is based on the input image, wherein a virtual interface is overlaid over the landmark pattern in the output image, wherein a pose of the virtual interface in the output image is based on the pose of the landmark pattern in the input image.

In another example, a method of image processing is provided. The method includes receiving an input image of a scene, the input image captured by an image sensor; detecting, in the input image of the scene, a landmark pattern displayed on a first display in the scene; determining a pose of the landmark pattern in the input image; and causing a second display to display an output image that is based on the input image, wherein a virtual interface is overlaid over the landmark pattern in the output image, wherein a pose of the virtual interface in the output image is based on the pose of the landmark pattern in the input image.

In another example, a non-transitory computer-readable medium is provided that has stored thereon instructions that, when executed by one or more processors, cause the one or more processors to: receive an input image of a scene, the input image captured by an image sensor; detect, in the input image of the scene, a landmark pattern displayed on a first display in the scene; determine a pose of the landmark pattern in the input image; and cause a second display to display an output image that is based on the input image, wherein a virtual interface is overlaid over the landmark pattern in the output image, wherein a pose of the virtual interface in the output image is based on the pose of the landmark pattern in the input image.

In another example, an apparatus for image processing is provided. The apparatus includes means for receiving an input image of a scene, the input image captured by an image sensor; means for detecting, in the input image of the scene, a landmark pattern displayed on a first display in the scene; means for determining a pose of the landmark pattern in the input image; and means for causing a second display to display an output image that is based on the input image, wherein a virtual interface is overlaid over the landmark pattern in the output image, wherein a pose of the virtual interface in the output image is based on the pose of the landmark pattern in the input image.

In some aspects, the landmark pattern includes at least one of a linear glyph, a linear barcode, a barcode a two-dimensional (2D) glyph, a 2D barcode, a Quick Response (QR) code, a micro QR code, a barcode, a MaxiCode, an Aztec code, a PDF417 code, an ArUco code, a data matrix, a grid matrix, a code one code, a stacked barcode, a shotcode, a JAB code, a high capacity color barcode (HCCB), a checkerboard pattern, a three-dimensional (3D) glyph, a 3D barcode, and one or more colors.

In some aspects, the methods, apparatuses, and computer-readable medium described above further comprise: identifying that an object occludes a region of the first display that includes at least a portion of the landmark pattern in the input image, and wherein to causing the second display to display the output image includes occluding a portion of the virtual interface that corresponds to the region of the first display in the output image.

In some aspects, the methods, apparatuses, and computer-readable medium described above further comprise: generating at least a portion of the virtual interface. In some aspects, the methods, apparatuses, and computer-readable medium described above further comprise: receiving at least a portion of the virtual interface from a display device that includes the first display.

In some aspects, the methods, apparatuses, and computer-readable medium described above further comprise: generating at least a portion of the output image. In some aspects, generating at least the portion of the output image includes modifying the virtual interface using a perspective distortion that is based on the pose of the landmark pattern in the input image.

In some aspects, the methods, apparatuses, and computer-readable medium described above further comprise: generating landmark pattern data corresponding to the landmark pattern; and sending the landmark pattern data to a display device that includes the first display for the display device to display the landmark pattern on the first display in response to receiving the landmark pattern data.

In some aspects, the methods, apparatuses, and computer-readable medium described above further comprise: receiving, from a display device that includes the first display, a display interface input identifier indicative of a portion of the first display receiving a display interface input via a display interface of the display device, the display interface associated with the first display. In some aspects, the first display is a display layer of a touchscreen display of the display device, wherein the display interface is a touch-sensitive layer of the touchscreen display, wherein the display interface input is a touch input detected by the touch-sensitive layer of the touchscreen display. In some aspects, the display interface controls a cursor on the first display, wherein the display interface input is a cursor input based on a position of the cursor on the first display, wherein the display interface includes at least one of a mouse, a trackpad, a touch-sensitive surface, a touchscreen, a joystick, a keypad, a keyboard, a button, a controller, and a remote control. In some aspects, the display interface performs hand tracking of a hand in relation to the first display, wherein the display interface input indicates a position on the first display corresponding to a position of the hand, wherein the display interface includes at least one of a camera and a range sensor, wherein the display interface input is associated with at least one of the hand touching the position on the first display, the hand hovering over the position on the first display, the hand pointing at the position on the first display, and the hand gesturing with respect to the position on the first display.

In some aspects, the methods, apparatuses, and computer-readable medium described above further comprise: identifying that the portion of the first display indicated by the display interface input identifier aligns with a portion of the virtual interface in the output image. In some aspects, the methods, apparatuses, and computer-readable medium described above further comprise: modifying the virtual interface automatically in response to identifying that the portion of the first display indicated by the display interface input identifier aligns with the portion of the virtual interface in the output image. In some aspects, the methods, apparatuses, and computer-readable medium described above further comprise: receiving a second input image of the scene, the second input image captured by the image sensor after capture of the input image; and causing the second display to display a second output image, wherein the second output image includes virtual content overlaid over the second input image, wherein the virtual content is automatically set based on identifying that the portion of the first display indicated by the display interface input identifier aligns with the portion of the virtual interface in the output image. In some aspects, the methods, apparatuses, and computer-readable medium described above further comprise: outputting an audio clip automatically in response to identifying that the portion of the first display identified by the display interface input identifier aligns with the portion of the virtual interface in the output image. In some aspects, the methods, apparatuses, and computer-readable medium described above further comprise: outputting a vibration automatically in response to identifying that the portion of the first display identified by the display interface input identifier aligns with the portion of the virtual interface in the output image.

In some aspects, the methods, apparatuses, and computer-readable medium described above further comprise: determining a size of the first display in the input image, wherein a size of the virtual interface in the output image is based on the size of the first display in the input image. In some aspects, the methods, apparatuses, and computer-readable medium described above further comprise: determining a size of the landmark pattern in the input image, wherein a size of the virtual interface in the output image is based on the size of the landmark pattern in the input image.

In some aspects, the methods, apparatuses, and computer-readable medium described above further comprise: the image sensor. In some aspects, the methods, apparatuses, and computer-readable medium described above further comprise: the second display.

In some aspects, the apparatus is, is part of, and/or includes a wearable device, an extended reality device (e.g., a virtual reality (VR) device, an augmented reality (AR) device, or a mixed reality (MR) device), a mobile device (e.g., a mobile telephone or so-called "smart phone" or other mobile device), a wireless communication device, a camera, a personal computer, a laptop computer, a server computer, a vehicle or a computing device or component of a vehicle, a head-mounted display (HMD) device, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
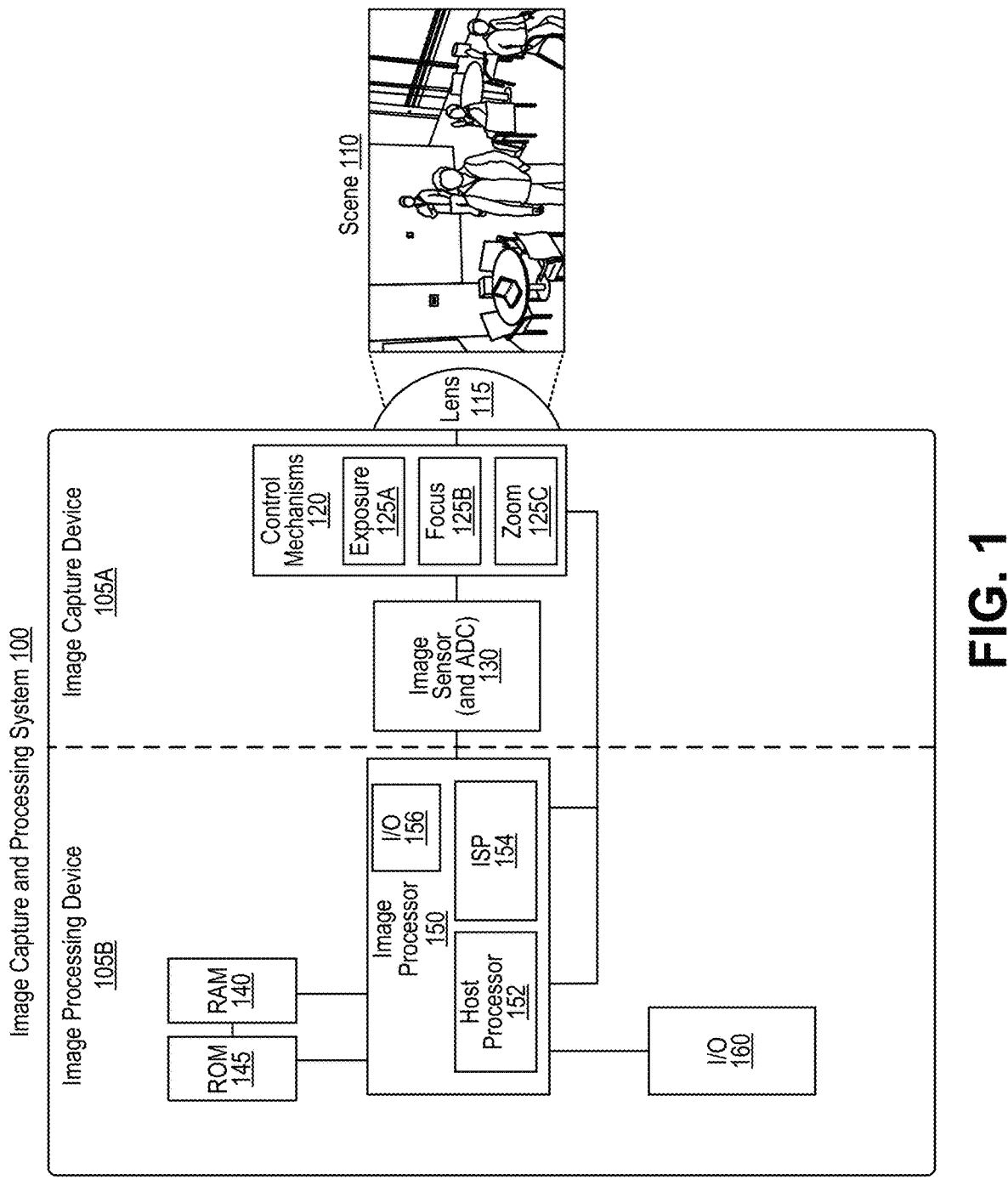
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capturing and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

An extended reality (XR) device is a device that displays an environment to a user, and can include, for example, a head-mounted display (HMD), glasses (e.g., augmented reality (AR) glasses), a mobile handset, or other device. The environment is at least partially different from the real-world environment in which the user and the device are located, and may for instance include virtual content. In some examples, the environment that the XR device displays to the user can be at least partially virtual. In some cases, the user can interactively change their view of the environment that the XR device displays, for example by tilting the XR device and/or or moving the XR device laterally. Tilting the XR device can include tilts or rotations along the pitch axis, the yaw axis, the roll axis, or a combination thereof. Lateral movements of the XR device can include lateral movements along paths charted within a 3-dimensional volume having 3 perpendicular axes, such as an X, a Y axis, and a Z axis. XR devices that only track rotation of the XR device can be referred to XR devices with three degrees of freedom (3DoF). XR devices that track both tilting and lateral movement of the XR device can be referred to XR devices with six degrees of freedom (6DoF). Extended reality (XR) can include virtual reality (VR), augmented reality (AR), mixed reality (MR), or combinations thereof.

An XR device can include sensors, such as image sensors (e.g., of cameras), accelerometers, gyroscopes, inertial measurement units (IMUs), light detection and ranging (LIDAR) sensors, radio detection and ranging (RADAR) sensors, sound detection and ranging (SODAR) sensors, sound navigation and ranging (SONAR) sensors, one or more time-of-flight (ToF) sensors, one or more structured light sensors, one or more microphones, one or more other sensors described herein, or combinations thereof. XR devices that are HMDs, for example, two cameras can be positioned approximately at locations on the HMD corresponding to the user's left and right eyes. The XR device can use data captured by these sensors to detect movement of the XR device within the real-world environment, for instance so that the XR device can update the user's view of the environment interactively based on rotation and/or lateral movement of the XR device. Image sensors of XR devices can be used to capture visual representations the real-world environment. Some XR devices can also use data captured by these sensors to detect and/or track features of one or more objects, such as a user's hand(s) or other person(s) in the environment, for instance through the use of feature detection, feature recognition, feature tracking, object detection, object recognition, object tracking, vehicle detection, vehicle recognition, vehicle tracking, facial detection, facial recognition, facial tracking, person detection, person recognition, person tracking, animal detection, animal recognition, animal tracking, or a combination thereof. The XR device can display content based on the sensor data captured by its sensors (e.g., visual representations of the environment captured by the image sensors) to the user of the XR device through one or more displays of the XR device.

In some use cases of XR, it is useful to receive inputs from a user, for instance to control virtual objects, to interact with interfaces, to adjust settings of the XR device itself, and/or to turn the XR device itself on or off. For example, in XR-based video gaming, a user may use inputs to control a virtual character. A user may also use inputs to adjust a volume level, control playback of a song or video (e.g., through functions like pause, play, rewind, fast-forward, or scrubbing) that the XR device is playing for the user, and the like. Traditional video game controllers can be imprecise for certain types of inputs, such as fine scrolling or sliding adjustments, and can be bulky and inconvenient for users to carry. Mid-air gestures can be imprecise due to lack of tactile feedback and reliance on hand tracking, which can have inconsistent reliability and can demand high power draw at the XR device.

Display interface devices with display-based interfaces are commonly used by users, including for instance mobile handsets, tablet devices, laptop computers, televisions, and smart watches. A display interface device with a display-based interface can include, for example, a touchscreen device with a touchscreen interface that can display an interface on the touchscreen and receive inputs through the touchscreen. Display interface devices with display-based interfaces can also include devices that use a cursor, a trackpad, a keypad, a controller, a remote control, and the like, to interact with a displayed interface. Display interface devices with display-based interfaces can receive precise and tactile inputs, allowing users to interact with a displayed interface. For instance, a touchscreen can receive tactile touch-based inputs to the touchscreen device, allowing users to interact with the displayed interface in a precise manner. However, display interface devices have traditionally not been used together with XR devices. In some cases, content displayed on a display screen, such as an interface displayed on a touchscreen, may appear unclear or may include one or more visual artifacts in an image captured by an XR device's image sensor, for instance due to a desynchronization or mismatch between a refresh rate of the display screen and the capture rate of the XR device's image sensor.

Techniques are described herein for enabling an XR device to make use of one or more display interface devices. Using such techniques, an XR can provide virtual interfaces for XR content presented to the user by the XR device. The virtual interfaces can provide real display interface inputs from the display interface device to the XR device (e.g., real touch-based inputs from a touchscreen of the display interface device). Use of real display interface inputs from the display interface device by the XR device can improve precision by providing tactile sensation (e.g., of the touchscreen, of a mouse, of a trackpad, of one or more buttons of a keypad or controller or remote control, and/or of a joystick) to users providing inputs, improving over mid-air gestures that can be imprecise and that lack tactile sensation or feedback. Use of real display interface inputs from the display interface device by the XR device can improve precision for certain types of inputs to the XR device, such as fine scrolling or sliding adjustments, that are generally imprecise through mid-air gestures, or other inputs that lack a display interface component.

Because display interface devices can have a variety of sizes, screen dimensions, and form factors, it can be difficult for an XR device to track the position and orientation of a display interface device. Thus, it can be difficult for the XR device to track interactions by a user with the display interface. It can also be difficult for the XR device to augment a visual representation of an interface displayed by a device of the display interface device that the XR device captures through its cameras, in order to display the augmented version of the visual representation to the user of the XR device.

Rather than displaying a display interface for the XR device 202, the display interface device can be configured to display one or more landmark patterns. The one or more landmark patterns can be designed so that the XR device can effectively recognize visual representations of the landmark patterns in image data captured by the cameras of the XR device. The one or more landmark patterns can be designed so that the XR device can effectively track the pose and/or size of the visual representations of the landmark patterns in the image data over time. Pose can include position (e.g., two-dimensional coordinates in the image and/or three-dimensional coordinates in the environment), orientation (e.g., pitch, yaw, and/or roll), or a combination thereof. Size can include three-dimensional volume, two-dimensional area, and/or one-dimensional measurement (e.g., height, width). Size can be absolute or relative. By tracking the pose of the landmark patterns, the XR device can also track the pose and/or size of the display of the display interface device.

In some examples, the one or more landmark patterns can include one or more Quick Response (QR) codes, one or more micro QR codes, one or more barcodes, one or more MaxiCodes, one or more Aztec codes, one or more PDF417 codes, one or more ArUco codes, one or more data matrices, one or more grid matrices, one or more code one codes, one or more stacked barcodes, one or more shotcodes, one or more JAB codes, one or more high capacity color barcodes (HCCBs), one or more two-dimensional (2D) barcodes, one or more three-dimensional (3D) barcodes, one or more checkerboard patterns, one or more of another type of recognizable glyph or pattern, or a combination thereof. In an output image that the XR device displays to its user, the XR device can overlay a virtual interface over the landmark patterns, replace the landmark patterns with the virtual interface, or a combination thereof. A pose and/or size of the virtual interface can be based on the pose and/or size of the landmark patterns, and/or based on a pose and/or size of the display of the display interface device. For instance, the XR device can position, move, resize, resample, rescale, upsample, upscale, downsample, downscale, enlarge, shrink, rotate, skew, warp (e.g., perspective warping), and/or distort (e.g., perspective distortion) the virtual interface to simulate the pose and/or size of the landmark patterns and/or of the display of the display interface device.

In an illustrative example, the XR device can capture an image of a scene using an image sensor of the XR device. The scene includes at least a portion of a display of display interface device that is displaying a landmark pattern on its display. The display is in the field of view of the XR device's image sensor, and the image depicts at least the landmark pattern as displayed on the display of the display interface device. The XR device can detect and/or identify, in the image of the scene, a visual representation (e.g., depiction) of a landmark pattern that is displayed on the display of the display interface device. The XR device can determine, based on the visual representation of the landmark pattern, the pose and/or size of the landmark pattern and thus the pose and/or size of the display of the display interface device. The XR device can generate an output image based on the image of the scene and based on the pose and/or size of the display of the display interface device. For instance, the output image can be a modified variant of the captured image in which the XR device overlays a virtual interface over the visual representation of the landmark pattern, in some cases replacing the visual representation of the landmark pattern with the virtual interface. The XR device can position, orient, resize, rotate, skew, warp, and/or distort the virtual interface to have a virtual pose, simulated pose that is based on the recognized pose of the landmark pattern and/or the recognized pose of the display of the display interface device. The XR device can position, orient, resize, rotate, skew, warp, and/or distort the virtual interface to have a virtual size and/or simulated size that is based on the recognized size of the landmark pattern and/or the recognized size of the display of the display interface device. The XR device can display the output image to the user through one or more displays of the XR device. Thus, to the user of the XR device, the virtual interface can appear to be displayed on the display of the display interface device 250 on top of, and/or instead of, the landmark pattern.

As noted above, providing the XR device with a display interface of the display interface device through which the XR device can receive display interface inputs from the display interface device can improve precision of inputs used by the XR device and can provide tactile sensation to users providing inputs, improving over mid-air gestures. Likewise, providing the XR device with a display interface through which the XR device can receive display interface inputs from the display interface device can improve precision for certain types of inputs to the XR device, such as fine scrolling or sliding adjustments, that are generally imprecise through game controllers (without a corresponding display interface), mid-air gestures, or other input operations that lack a corresponding display interface. Overlaying the virtual interface over the landmark pattern and/or replacing a landmark pattern with the virtual interface can ensure that the virtual interface appears clear and sharp as displayed by the XR device to the user, overcoming any visual artifacts (e.g., scanlines or chromatic aberrations) that might otherwise be caused by desynchronization or mismatch between a refresh rate of the display of the display interface device and the capture rate of the XR device's image sensor, and/or by interactions between the light from the display of the display interface device and the lenses and/or other optics elements of the image capture hardware of the XR device. Technical improvements thus include reduction or elimination of such visual artifacts, and improvements to clarity and sharpness of interfaces displayed to a user of the XR device using a display of the XR device. Overlaying the virtual interface over the landmark pattern and/or replacing a landmark pattern with the virtual interface can also allow the virtual interface to appear clearer than might be possible on the display of the display interface device, for instance allowing the virtual interface to surpass a limited resolution and/or color gamut and/or color coverage of the display of the display interface device. Technical improvements thus include improvements to resolution, clarity, and/or sharpness of interfaces. Overlaying the virtual interface over the landmark pattern and/or replacing a landmark pattern with the virtual interface can allow the virtual interface to appear more colorful than might be possible on the display of the display interface device, for instance allowing the virtual interface to be in full color even if the display of the display interface device is a monochrome or limited-color display (e.g., an electronic ink display or electronic paper display as used in ebook reader devices). Technical improvements thus include improvements to color and/or capabilities of interfaces. Overlaying the virtual interface over the landmark pattern and/or replacing a landmark pattern with the virtual interface can also allow parts of the virtual interface to expand beyond the physical dimensions of display of the display interface device, and/or of the display interface device itself. For example, parts of the virtual interface can appear to extend beyond the edges of the display of the display interface device, and/or beyond the edges of the display interface device itself. Technical improvements thus include improvements dimensionality and/or size of interfaces. The display interface device can also provide vibrational feedback to the user, for example as haptic feedback for button-presses, touch-based interactions, "rumble" vibrations based on detection of certain events or conditions (e.g., video game events), or combinations thereof. Technical improvements thus include improvements to feedback from interface interactions. Knowledge of how the landmark pattern should look at the XR device can also allow the XR device to identify, with improved accuracy, the precise metes and bounds of any occlusion (e.g., a user's fingers and/or hands) that occludes at least part of a landmark pattern—and allows the XR device to accurately reproduce the occlusion to occlude a corresponding part of the virtual interface. Technical improvements thus include improvements to occlusion representation and accuracy. Different landmark patterns can be displayed at the display of the display interface device over time according to a preset schedule, allowing the XR device to improve latency detection and thus improve time synchronization between the display interface device and the XR device, based on at time difference between the display interface device changing the landmark pattern and the XR device's detection of that one of the change to the landmark pattern. Technical improvements thus include improvements to mapping display interface inputs to time, and improved synchronization of display interface inputs to virtual interfaces. Overlaying the virtual interface over the landmark pattern and/or replacing a landmark pattern with the virtual interface can also allow the virtual interface to remain private to the user the XR device, since anyone who sees the display of the display interface device who is not a user of the XR device simply sees the landmark pattern, not the virtual interface that the XR device overlays on top of the landmark pattern. Technical improvements thus include improvements to security and privacy with respect to interfaces.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1210 discussed with respect to the computing device 1200. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1225, read-only memory (ROM) 145 and/or 1220, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1235, any other input devices 1245, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Systems, apparatuses, processes, and computer-readable media are described herein for providing a virtual interface for an XR device using a display interface device. The display interface device may, in some examples, be a touch-screen device that includes a touchscreen. The display interface device may include one or more display interfaces for interacting with an interface displayed on the display, such as a touchscreen, a mouse controlling a cursor or other display element on the display, a trackpad controlling a cursor or other display element on the display, a keypad controlling a text input and/or cursor or other display element on the display, a controller controlling a text input and/or cursor or other display element on the display, a remote control controlling a text input and/or cursor or other display element on the display, a hand tracker for hand tracking of interactions with the display using a camera (e.g., of the XR device and/or of the display interface device), a hand tracker for hand tracking of interactions with the display using an active depth sensor (e.g., RADAR, LIDAR, SONAR, SODAR, structured light, time of flight) (e.g., of the XR device and/or of the display interface device), a hand tracker for hand tracking of interactions with the display using an ultrasound sensor (e.g., of the XR device and/or of the display interface device), another input device 1245 providing an input interface associated with a display, or a combination thereof. The XR device may include one or more cameras that can capture one or more images. The one or more cameras can each include an image capture and processing system 100, an image capture device 105A, an image processing device 105B, an image sensor 130, or a combination thereof. The XR device can process the images and detect, within the images, a depiction of a landmark pattern displayed on a display of a display interface device that is in a field of the view of the image sensors. The XR device 202 can detect, within the images, a pose and/or size of the landmark pattern in the images, and can overlay a virtual interface over the landmark pattern so that the virtual interface has a corresponding pose and/or size in an output image that the XR device displays to its user.

Figure 2:
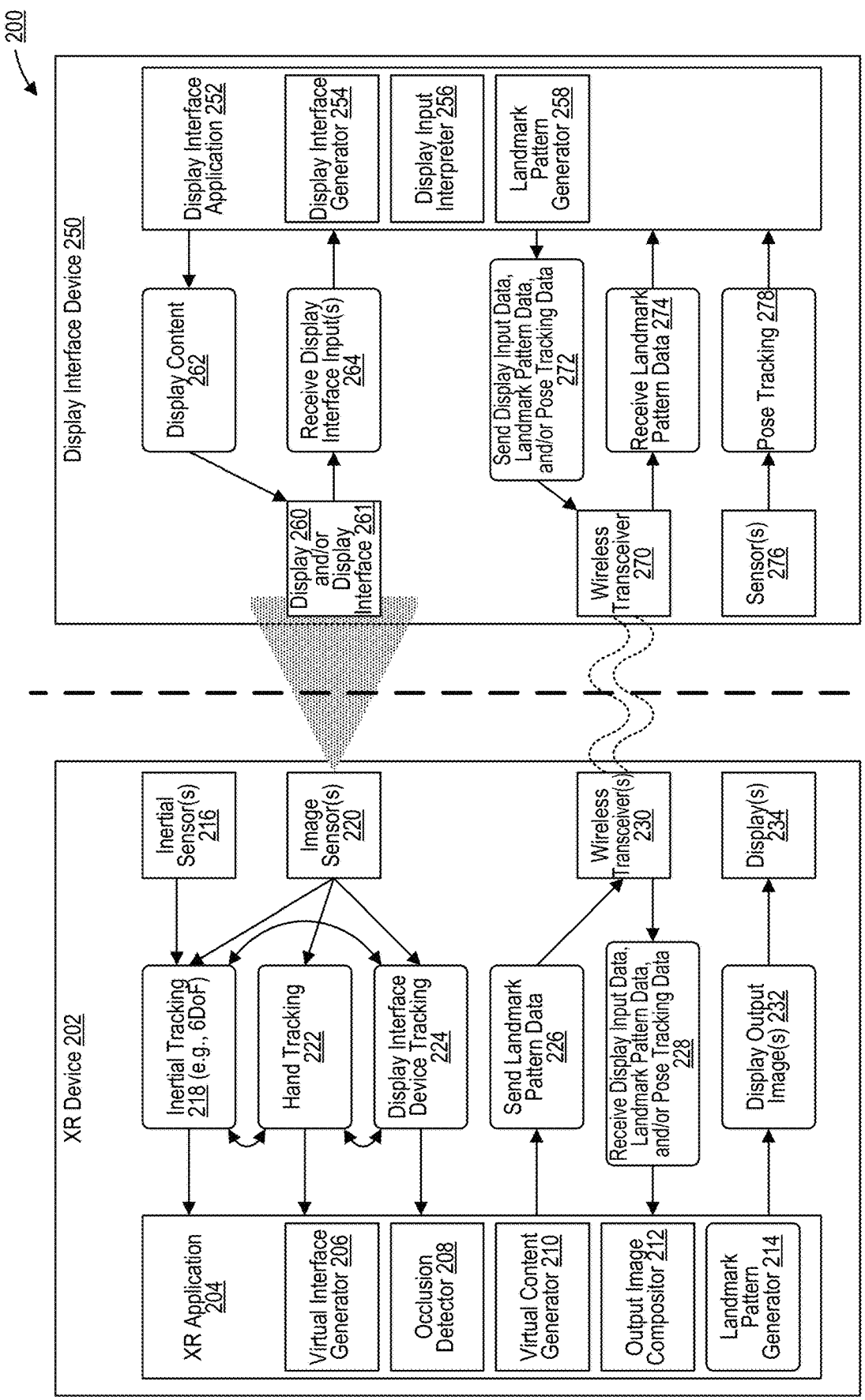
FIG. 2 is a block diagram illustrating an example architecture of an extended reality (XR) system with an XR device and a display interface device, in accordance with some examples.

FIG. 2 is a block diagram illustrating an example architecture of an extended reality (XR) system 200 with an XR device 202 and a display interface device 250, in accordance with some examples. The display interface device 250 can be referred to as a display device. The XR device 202 of the XR system 200 includes an XR application 204 that may be stored by memory of the XR device 202 and/or executed by one or more processors of the XR device 202. The XR device 202 includes one or more inertial sensors 216, which may include one or more accelerometers, one or more gyroscopes, one or more positioning receivers, one or more inertial measurement units (IMUs), or a combination thereof. Position receivers can include global navigation satellite system (GNSS) receivers such as global positioning system (GPS) receivers. Positioning receivers can include beacon-based short-range wireless signal receivers that receive short-range wireless signals from beacon devices that transmit the short-range wireless signals. Positioning receivers can include wireless local area network (WLAN) receivers, such as Wi-Fi receivers. Positioning receivers can include cellular network receivers, such as 3G, 4G, LTE, or 5G network receivers. Using the one or more inertial sensors 216, the XR device 202 (e.g., the XR application) can perform inertial tracking 218 of the XR device 202. In some examples, inertial tracking 218 can be performed by the XR application 204 of the XR device 202, by an inertial tracking engine of the XR device 202, by the processors of the XR device 202, or a combination thereof. Inertial tracking 218 can include tracking a pose of the XR device 202 within its real-world environment. The pose of the XR device 202 can include the position of the XR device 202 (e.g., three-dimensional coordinates in the environment and/or two-dimensional coordinates such as latitude and longitude), orientation (e.g., pitch, yaw, and/or roll), or a combination thereof. Inertial tracking 218 can include tracking the pose of the XR device 202 with 3 degrees of freedom (3DoF), 6 degrees of freedom (6DoF), or a combination thereof.

The XR device 202 can include one or more image sensors 220. The one or more image sensors 220 may each be examples of the image sensor 130 of FIG. 1. In some examples, each of the one or more image sensors 220 includes an image capture device 105A, an image processing device 105B, an image capture and processing system 100 of FIG. 1, or a combination thereof. The one or more image sensors 220 can capture one or more images of a scene. In some examples, the scene may include at least a portion of the display interface device 250, so that the one or more images of the scene depict at least the portion of the display interface device 250 (e.g., at least a portion of the display 260 and/or the display interface 261). A shaded triangle is illustrated in FIG. 2 extending rightward from the box representing the one or more image sensors 220. The shaded triangle represents a possible field of view (FOV) of the one or more image sensors 220. The shaded triangle extends to a box of the display interface device 250 that represents the display 260 and/or display interface 261 of the display interface device 250, indicating that the FOV of the one or more image sensors 220 can include at least a portion of the display 260 and/or display interface 261 of the display interface device 250. In some examples, the display 260 can be a display of a touchscreen display, and the display interface 261 can be a touch-sensitive layer of the touchscreen display. In examples where the display 260 and/or display interface 261 are a touchscreen display, The one or more images captured by the one or more image sensors 220 of the XR device 202 can be used for the inertial tracking 218. For instance, one or more images captured by the one or more image sensors 220 of the XR device 202 can include sequential video frames, which can be compared to one another to identify changes to the FOV of the one or more image sensors 220 of the XR device 202 indicative of movement of the XR device 202 along one or more of the 6DoF. The one or more images captured by the one or more image sensors 220 of the XR device 202 can be used for hand tracking 222, to track the pose(s) of one or both hands of the user of the XR device 202 and/or one or more hands of other individuals in the FOV of the one or more image sensors 220 of the XR device 202. In some examples, hand tracking 222 can be performed by the XR application 204 of the XR device 202, by a hand tracking engine of the XR device 202, by the processors of the XR device 202, or a combination thereof. In some examples, hand tracking 222 utilizes feature detection, feature recognition, feature tracking, object detection, object recognition, object tracking, hand detection, hand recognition, hand tracking, finger detection, finger recognition, finger tracking, person detection, person recognition, person tracking, facial detection, facial recognition, facial tracking, facial detection, or a combination thereof. In some examples, inertial tracking data (e.g., indicating the pose of the XR device 202) from the inertial tracking 218 can also be used by the XR device 202 to perform hand tracking 222, for instance to help identify which movements of the hand(s) in the image (s) captured by the image sensor(s) 220 actually represent movements of the hand(s) in the environment, and which movements of the hand(s) in the image(s) captured by the image sensor(s) are caused by movement of the XR device 202 within the environment.

The one or more images captured by the one or more image sensors 220 of the XR device 202 can be used for display interface device tracking 224, to track the pose of the display interface device 250, for instance by detecting and tracking the pose and/or size of the landmark pattern displayed by the display 260 and/or display interface 261 of the display interface device 250. Display interface device tracking 224 can be performed by the XR application 204 of the XR device 202, by display interface device tracking engine of the XR device 202, by the processors of the XR device 202, or a combination thereof. As noted above, pose can include position (e.g., two-dimensional coordinates in the image and/or three-dimensional coordinates in the environment), orientation (e.g., pitch, yaw, and/or roll), or a combination thereof. Size can include three-dimensional volume, two-dimensional area, and/or one-dimensional measurement (e.g., height, width). Size can include absolute size and/or relative size (relative to something else in the image data). Size of the landmark patterns can be identified as an absolute size or as a size relative to another size in the image data (e.g., the size of the display interface device 250 and/or its display).

In some examples, the XR device 202 can store a reference copy of the landmark pattern, or landmark pattern data that characterizes the landmark pattern and/or can be used to recreate a reference copy of the landmark pattern (e.g., data encoded by a QR code or barcode or other coding scheme of the landmark pattern). The XR device 202 can compare a depiction of the landmark pattern in the one or more images captured by the one or more image sensors 220 of the XR device 202 to the stored reference copy of the landmark pattern to identify how the depiction of the landmark pattern in the one or more image has been positioned, moved, resized, rescaled, resampled, rotated, skewed, warped (e.g., perspective warping), and/or distorted (e.g., perspective distortion) relative to the stored reference copy of the landmark pattern. This way, the XR device 202 can identify the pose of the landmark pattern, which can match the pose of the display 260 and/or display interface 261 of the display interface device 250. Similarly, the XR device 202 can identify the size of the landmark pattern, and can determine the size of the display 260 and/or display interface 261 of the display interface device 250 based on the size of the landmark pattern. In some examples, display interface device tracking 224 utilizes feature detection, feature recognition, feature tracking, object detection, object recognition, object tracking, or a combination thereof.

For instance, the pose of the landmark patterns may be the pose of the display 260 of the display interface device 250. The display interface device 250 can be configured to, and can, display the landmark patterns so that the landmark patterns cover a predetermined amount or proportion of the surface of the display 260 (e.g., 10%, 20%, 30%, 40%, 50%, 60%, 70%, 80%, 90%, 100%, or a value in between any two of the previously listed values). For instance, if the display interface device 250 is configured to display the landmark patterns across 100% of the display 260, then the XR device 202 can determine that the size of the display 260 is equal to the size of the landmark patterns. If the display interface device 250 is configured to display the landmark patterns across 50% of the display 260, then the XR device 202 can determine that the size of the display 260 can be double the size of the landmark patterns, and so forth.

In some examples, the XR device 202 can also track the pose and/or size of the display 260 and/or the display interface device 250 separately from tracking the landmark patterns, for instance based on feature extraction, feature detection, and recognition through the features of one or more of the corners and/or edges of the display 260 and/or of the display interface device 250. In some examples, the display interface device 250 can display other content on the display 260 (e.g., a highly saturated color or pattern, or anything identified herein that could also be a landmark pattern) at least near one or more of the edges and/or corners of the display 260 to make the edges and/or corners of the display 260 easier for the XR device 202 to identify and extract features based on. In some examples, the display interface device 250 can send information about the display interface device 250 to the XR device 202 (e.g., via the wireless transceiver 270 as part of block 272), and the XR device 202 can receive the information about the display interface device 250 from the display interface device 250 (e.g., via the wireless transceiver 230 as part of block 228). The information about the display interface device 250 can in some cases identify the size and/or dimensions of the display 260, the display interface 261, and/or of the display interface device 250. The information about the display interface device 250 can in some cases include an identifier of the display interface device 250 (e.g., a model name and/or brand), based on which the XR device 202 can determine the size and/or dimensions of the display 260, the display interface 261, and/or of the display interface device 250 (e.g., by querying a database or table or other data structure using the identifier of the display interface device

250). In some examples, the display interface device 250 can send the information about the display interface device 250 to the XR device 202 in response to the XR device 202 sending a request for the information about the display interface device 250 to the display interface device 250 (e.g., via the wireless transceiver 230 as part of block 226), and the display interface device 250 receiving the request from the XR device 202 (e.g., via the wireless transceiver 270 as part of block 274). Size of the display 260, of landmark pattern(s) displayed thereon, of the display interface 261, and/or of the display interface device 250 may be important for scaling a virtual interface and/or virtual content to be larger for a larger displays 260 and/or display interface devices 250, and to be smaller for a smaller displays 260 and/or display interface devices 250.

In some examples, inertial tracking data (e.g., indicating the pose of the XR device 202) from the inertial tracking 218 can also be used by the XR device 202 to perform display interface device tracking 224, for instance to help identify which movements of the display interface device 250 in the image(s) captured by the image sensor(s) 220 actually represent movements of the display interface device 250 in the environment, and which movements of the display interface device 250 in the image(s) captured by the image sensor(s) are caused by movement of the XR device 202 within the environment. In some examples, hand tracking data (e.g., indicating a pose of a hand) from the hand tracking 222 can also be used by the XR device 202 to perform display interface device tracking 224, for instance to help identify a pose of the display interface device 250 by tracking a pose of a hand that is holding and/or interacting with the display interface device 250. In some examples, display interface device tracking data (e.g., indicating a pose of the display interface device 250) from the display interface device tracking 224 can be used by the XR device 202 to perform hand tracking 222, for instance to help identify a pose of a hand that is holding and/or interacting with the display interface device 250 by tracking a pose of the display interface device 250. In some examples, hand tracking data (e.g., indicating a pose of a hand) from the hand tracking 222 can also be used by the XR device 202 to perform inertial tracking 218, for instance to help identify a pose of the XR device 202 relative to one or more hand(s) in the environment. In some examples, display interface device tracking data (e.g., indicating a pose of the display interface device 250) from the display interface device tracking 224 can be used by the XR device 202 to perform inertial tracking 218, for instance to help identify a pose of the XR device 202 relative to the display interface device 250 in the environment.

The XR application 204 can include a landmark pattern generator 214. In some examples, landmark pattern generator 214 of the XR application 204 can generate the landmark pattern to be displayed at the display 260 of the display interface device 250. The landmark pattern generator 214 of the XR application 204 can also store a reference copy of the landmark pattern at the XR device 202, which the XR device 202 can use for display interface device tracking 224 by comparing depictions of the landmark pattern in image(s) captured by the image sensor(s) 220 to the reference copy of the landmark pattern. In some examples, the landmark pattern generator 214 of the XR application 204 can generate initial landmark pattern data that can be used by the XR device 202 or by the display interface device 250 (e.g., by the landmark pattern generator 258) to actually generate the landmark pattern. The landmark pattern can be, or can include, a linear glyph, such as a linear barcode. The landmark pattern can be, or can include, a two-dimension (2D) glyph, such as one or more of any of a 2D barcode, a quick response (QR) code, a micro QR code, a barcode, a MaxiCode, an Aztec code, a PDF417 code, an ArUco code, a data matrix, a grid matrix, a code one code, a stacked barcode, a shotcode, a JAB code, a high capacity color barcode (HCCB), a checkerboard pattern, or a combination thereof. The landmark pattern can be, or can include, a three-dimensional (3D) glyph, such as a 3D barcode. The landmark pattern can be, or can include, one or more predetermined colors (e.g., a highly saturated color that may stand out in an image). The landmark pattern can be, or can include, another type of recognizable glyph or pattern. In some examples, the landmark pattern may visually encode the initial landmark pattern data. For example, barcodes, QR codes, Aztec codes, MaxiCodes, PDF417 codes, and many of the other examples of landmark patterns identified above are visual encoding schemes for data, and can be used to visually encode a string of characters and/or other types of data. The initial landmark pattern data may include the string of characters and/or other types of data that are visually encoded in such landmark patterns.

The XR device 202 can include one or more wireless transceivers 230. The XR device 202 can send landmark pattern data (block 226) to the display interface device 250 using the one or more wireless transceivers 230. Sending the landmark pattern data (block 226) can be performed by the XR application 204 of the XR device 202, the wireless transceiver(s) 230, by the processors of the XR device 202, or a combination thereof. The display interface device 250 may receive the landmark pattern data (block 274) at one or more wireless transceivers 270 of the display interface device 250. Receiving the landmark pattern data (block 274) can be performed by the display interface application 252 of the display interface device 250, the wireless transceiver(s) 270, by the processors of the display interface device 250, or a combination thereof. The landmark pattern data sent from the XR device 202 to the display interface device 250 (block 226), and received at the display interface device 250 (block 274), can include the landmark pattern itself, for instance if the XR device 202 generates the landmark pattern entirely at the landmark pattern generator 214 of the XR device 202. The landmark pattern data sent from the XR device 202 to the display interface device 250 (block 226), and received at the display interface device 250 (block 274), can include the initial landmark pattern data representing the data that the landmark pattern encodes using a visual encoding scheme (e.g., QR code, Aztec code, etc.), for instance if the XR device 202 generates the initial landmark pattern data at the landmark pattern generator 214 of the XR device 202.

The display interface device 250 of the XR system 200 includes a display interface application 252 that may be stored by memory of the display interface device 250 and/or executed by one or more processors of the display interface device 250. The display interface application 252 can include a landmark pattern generator 258. The landmark pattern generator 258 can generate the landmark pattern to be displayed at the touchscreen 260 of the display interface device 250. The display interface device 250 can receive landmark pattern data (block 274) from the XR device 202 using the wireless transceiver(s) 270 of the display interface device 250 as discussed above. In some examples, the landmark pattern generator 258 of the display interface application 252 of the display interface device 250 generates the landmark pattern based on the landmark pattern data received by the display interface device 250 from the XR device 202 (block 274). As discussed above, the landmark pattern data received by the display interface device 250 from the XR device 202 (block 274) can include the landmark pattern itself. If the received landmark pattern data (block 274) includes the landmark pattern itself, the landmark pattern generator 258 can generate the landmark pattern by using the landmark pattern received in the landmark pattern data received by the display interface device 250 from the XR device 202 (block 274). If the received landmark pattern data (block 274) includes the landmark pattern itself, the landmark pattern generator 258 can generate the landmark pattern by resizing, resampling, rotating, and/or otherwise processing the landmark pattern received in the landmark pattern data received by the display interface device 250 from the XR device 202 (block 274). As discussed above, the landmark pattern data received by the display interface device 250 from the XR device 202 (block 274) can include initial landmark pattern data representing the data that the landmark pattern encodes using a visual encoding scheme (e.g., QR code, Aztec code, etc.). If the received landmark pattern data (block 274) includes the initial landmark pattern data, the landmark pattern generator 258 can generate the landmark pattern by encoding the initial landmark pattern data using the visual encoding scheme.

In some examples, the landmark pattern generator 258 of the display interface application 252 of the display interface device 250 generates the landmark pattern without receiving based on the landmark pattern data at the display interface device 250 from the XR device 202 (at block 274). For instance, the landmark pattern generator 258 can generate the initial landmark pattern data and/or the landmark pattern itself, entirely by itself. The display interface device 250 can use its wireless transceiver(s) 270 to send landmark pattern data to the XR device 202 (block 272). The XR device 202 may receive the landmark pattern data using its wireless transceiver(s) 230 (block 228), which the XR device 202 may use in order to have a reference landmark pattern to compare to depictions of the landmark pattern in image(s) captured by the image sensor(s) 220 of the XR device 202. Receiving the landmark pattern data (block 228) can be performed by the XR application 204 of the XR device 202, the wireless transceiver(s) 230, by the processors of the XR device 202, or a combination thereof. The landmark pattern data sent from the display interface device 250 to the XR device 202 (block 272) and received by the XR device 202 from the display interface device 250 (block 228) can include the initial landmark pattern data and/or the landmark pattern itself. If the received landmark pattern data (block 228) includes the initial landmark pattern data, the landmark pattern generator 214 can generate the landmark pattern by encoding the initial landmark pattern data using the visual encoding scheme.

The display interface device 250 may display content 262 on its display 260 and/or display interface 261. Displaying the content 262 can be performed by the display interface application 252 of the display interface device 250, the display interface generator 254, the landmark patter generator 258, the display 260, the display interface 261, a display controller of the display 260, by the processors of the display interface device 250, or a combination thereof. The content displayed (block 262) on the display 260 and/or display interface 261 by the display interface device 250 may include one or more landmark patterns, which may be generated by the landmark pattern generator 214, by the landmark pattern generator 258, or a combination thereof. The content displayed (block 262) on the display 260 and/or display interface 261 by the display interface device 250 may include displayed interfaces that are generated by the touchscreen interface generator 254. Displayed interfaces generated by the touchscreen interface generator 254 and displayed on the display 260 of the display interface device 250 can, in some cases, remain visible in an output image output by the XR device 202. For instance, the XR device 202 can overlay the virtual interface over and/or replace certain content on displayed on the display 260 and/or display interface 261 of the display interface device 250 (e.g., the landmark patterns) other than the displayed interface, without overlaying the virtual interface over and/or replacing the displayed interface. An example of such a displayed interface includes the displayed interface 710 of FIGS. 7A-7B, which is still visible to the user 505 wearing the XR device 520 as illustrated in FIG. 7B. The display interface may include one or more interactive touch-based interface elements, such as buttons, sliders, scrollbars, radio buttons, checkboxes, knobs, wheels, text fields, touch-based keypads, touch-based keyboards, touch-based drawing areas, or combinations thereof.

The display interface device 250 can receive display interface inputs 264 from the display 260 and/or display interface 261. Receiving the display interface inputs 254 can be performed by the display interface application 252 of the display interface device 250, the display interface 261, the display 260, the display interface interpreter 256, a display interface controller of the display interface 261, a display controller of the display 260, by the processors of the display interface device 250, or a combination thereof. In some examples, the display 260 and/or display interface 261 may include a touchscreen display with a display layer and a touch-sensitive layer, which may be referred to as a touch-sensing layer, a touch-sensitive surface, or a touch-sensing surface. The touch-sensitive layer may measure display interface inputs capacitively, resistively, or a combination thereof. The display 260 and/or display interface 261, in examples in which it is a touchscreen, may be a capacitive touchscreen, a resistive touchscreen, or a combination thereof. The display interface application 252 can include a display interface input interpreter 256 that can interpret signals from the touch-sensitive layer of the display 260 and/or display interface 261 into display interface input identifiers. The display interface input identifiers may include, for instance, coordinates identifying one or more portions of the display 260 and/or display interface 261 that received a touch input or another type of display interface input. In some cases, a display interface input may a tap or a press in a single location, in which case the corresponding display interface input may identify a single set of coordinates or a touch area representing the portion of the display 260 and/or display interface 261 that received the tap or press. The touch area may represent, for example, the surface area of a point of a finger or pointer that makes contact with the display 260 and/or display interface 261 during the display interface input. The touch area may, in some cases, be identified in the display interface input identifier by a set of coordinates and a radius, the touch are including an area having a radius around a point defined by the set of coordinates. In some cases, the display interface inputs may include swipe gestures, slide gestures, in which case the corresponding display interface input identifier(s) may include multiple sets of coordinates and/or areas may be used to identify one or more paths of the swipe gestures and/or slide gestures as the one or more portions of the display 260 and/or display interface 261 that received the display interface input(s). In some cases, the display interface 261 may include a different type of display interface 261, such as a mouse controlling a cursor or other display element on the display, a trackpad controlling a cursor or other display element on the display, a keypad controlling a text input and/or cursor or other display element on the display, a controller controlling a text input and/or cursor or other display element on the display, a remote control controlling a text input and/or cursor or other display element on the display, a hand tracker for hand tracking of interactions with the display using a camera (e.g., of the XR device and/or of the display interface device), a hand tracker for hand tracking of interactions with the display using an active depth sensor (e.g., RADAR, LIDAR, SONAR, SODAR, structured light, time of flight) (e.g., of the XR device and/or of the display interface device), a hand tracker for hand tracking of interactions with the display using an ultrasound sensor (e.g., of the XR device and/or of the display interface device), another input device 1245 providing an input interface associated with a display, or a combination thereof. Display interface inputs may also include clicking, double-clicking, clicking and dragging, circling, pointing at, hovering over, gesturing around or over, or a combination thereof.

In some cases, the display interface input interpreter 256 can compare a position of a display interface input to a known position at which display content is displayed on the display 260 and/or display interface 261. For instance, the display interface input interpreter 256 can compare a position of a display interface input to an interface element of a displayed interface, such as a button. If the position of the display interface input matches (e.g., overlaps with) the position of the interface element of the displayed interface, the display interface input interpreter 256 can identify (e.g., in the display interface input identifier) that the display interface input has activated or otherwise interacted with the interface element of the displayed interface. In some examples, the position of the display interface input matches (e.g., overlaps with) a specific portion of the landmark pattern that is displayed on the display 260 and/or display interface 261, and the display interface input interpreter 256 can identify (e.g., in the display interface input identifier) the specific portion of the displayed landmark pattern that the position of the display interface input matches (e.g., overlaps with). In some examples, the same process may be performed at least in part by the XR device 202, for instance in cases where display interface interactions are based on hand tracking. Examples of a display interface include the display interface 710 of FIGS. 7A-7B.

The display interface device 250 can send display interface input data (block 272) from the display interface device 250 to the XR device 202 using the wireless transceiver(s) 270. Sending the display interface input data (block 272) can be performed by the display interface application 252 of the display interface device 250, the display input interpreter 258, the wireless transceiver(s) 270, by the processors of the display interface device 250, or a combination thereof. The XR device 202 can receive (block 228) the display interface input data from the display interface device 250 using the wireless transceiver(s) 230. Receiving the display interface input data (block 228) can be performed by the XR application 204 of the XR device 202, the wireless transceiver(s) 230, by the processors of the XR device 202, or a combination thereof. The display interface input data can include one or more display interface input identifiers identifying one or more display interface inputs received at the display 260 and/or display interface 261 (block 264) and/or interpreted by the display interface input interpreter 256. In some cases, the display interface input identifiers can identify that a display interface input interacted with a displayed interface, which may cause the XR device 202 to perform an action, such as modifying a virtual interface, modifying virtual content, and/or modifying audio output to the user.

The XR application 204 can include a virtual interface generator 206, which can generate at least a portion of a virtual interface, such as the virtual interfaces 535, 635, 735, and/or 835. The virtual interface may include interactive interface elements, such as a buttons, sliders, scrollbars, radio buttons, checkboxes, knobs, wheels, text fields, touch-based keypads, touch-based keyboards, touch-based drawing areas, or combinations thereof. In some examples, the virtual interface generator 206 may size, rotate, skew, distort, or otherwise adjust properties of the virtual interface based on the pose and/or size of the landmark patterns and/or of the display 260 and/or of the display interface device 250. In some examples, at least a portion of the virtual interface may be generated at the display interface device 250 (e.g., by the display interface application 252), sent from the display interface device 250 to the XR device 202 (at block 272), and/or received at the XR device 202 from the display interface device 250 (at block 228). Sending the virtual interface (block 272) can be performed by the display interface application 252 of the display interface device 250, the display interface generator 254, a virtual interface generator of the display interface device 250, the wireless transceiver(s) 270, by the processors of the display interface device 250, or a combination thereof. Receiving the virtual interface (block 228) can be performed by the XR application 204 of the XR device 202, the wireless transceiver(s) 230, by the processors of the XR device 202, or a combination thereof. The XR application 204 can include an output image compositor 212, which generates an output image by combining (compositing) one or more images captured by the image sensor(s) 220 of the XR device 202 with virtual content, such as the virtual interface, other virtual content (e.g., the other visual content generated using the virtual content generator 210), or a combination thereof. To generate the output image, the output image compositor 212 can overlay the virtual interface over the landmark pattern depicted in the one or more images captured by the image sensor(s) 220 of the XR device 202. To generate the output image, the output image compositor 212 can replace the landmark pattern depicted in the one or more images captured by the image sensor(s) 220 of the XR device 202 with the virtual interface.

The output image compositor 212 can position, move, resize, resample, rescale, upsample, upscale, downsample, downscale, enlarge, shrink, rotate, skew, warp (e.g., perspective warping), and/or distort (e.g., perspective distortion) the virtual interface so that the pose and/or size of the virtual interface in the output image simulates the pose and/or size of the landmark patterns and/or of the display 260 and/or of the display interface 261 of the display interface device 250 (as determined using the display interface device tracking 224). The output image compositor 212 can warp, distort, and/or skew the virtual interface (e.g., using perspective warping and/or perspective distortion) to simulate rotation of the virtual interface about an axis other than an axis that is perpendicular to the image captured by the image sensor(s) 220. For instance, if the display 260 and/or the display interface device 250 and/or the landmark patterns are large in the image data, the virtual interface may be large. If the display 260 and/or the display interface device 250 and/or the landmark patterns are small in the image data, the virtual interface may be small. If the display 260 and/or the display interface device 250 and/or the landmark patterns are tilted and/or rotated and/or skewed according to a certain orientation or pose in the image data, the virtual interface may be tilted and/or rotated and/or skewed according to that orientation or pose.

In an illustrative example, the virtual interface may include a video playback control interface, which may include virtual buttons for pause, play, fast-forward, rewind, skip, previous, and other video playback control functions. In some cases, the video playback control interface can include one or more sliders, such as a video scrubbing slider and/or a volume slider. In some examples, the virtual interface can include images, videos, and other media.

The virtual content generator 210 can generate virtual content other than the virtual interface. The virtual content can include, for example, images and/or videos presented by a virtual interface (e.g., that represents an image viewer and/or a video viewer), one or more three-dimensional models, video game content, metadata of media played using the virtual interface, or a combination thereof. Examples of the virtual content generated by the virtual content generator 210 can include the virtual content 720 of FIGS. 7A-7B, the virtual content 840 of FIGS. 8A-8B, certain aspects of the music player virtual interface 535 of FIG. 5B (e.g., the album art, artist name, and/or song title), certain aspects of the music player virtual interface 535 (e.g., the album art, artist name, and/or song title), image viewer virtual interface 635 of FIG. 6B (e.g., the images), or a combination thereof. The output image compositor 212 can add the virtual content to the virtual interface or anywhere in the field of view of the image sensor(s) 220 of the XR device 202.

Figure 6A:
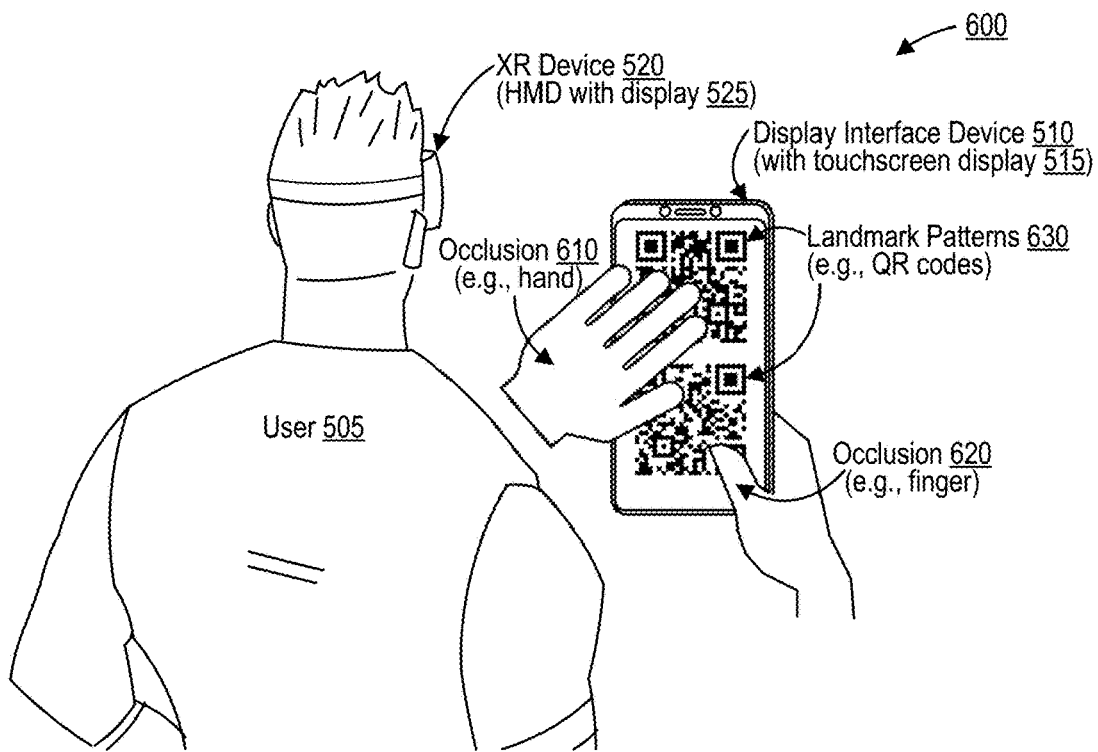
FIG. 6A is a perspective diagram illustrating a user wearing an extended reality (XR) device and holding a display interface device that is displaying two landmark patterns that are partially occluded by the user's hands and fingers, in accordance with some examples.
Figure 6B:
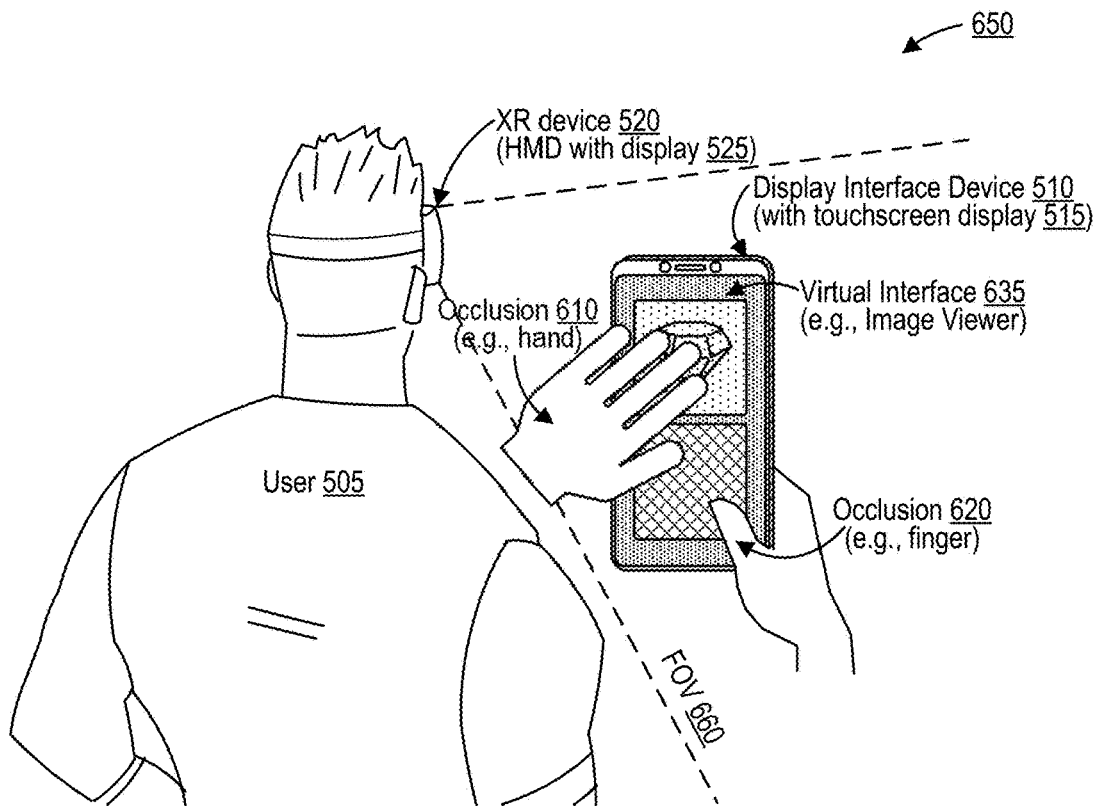
FIG. 6B is a perspective diagram illustrating a field of view (FOV) of the user wearing and viewing the environment through the extended reality (XR) device of FIG. 6A, in which a virtual interface is overlaid over the two landmark patterns and the occlusions are visible over the virtual interface, in accordance with some examples.

The XR application 204 can also include an occlusion detector 208, which can detect occlusions of a landmark pattern and/or another region of the display, such as by a user's hand (e.g., occlusion 610 of FIGS. 6A-6B) and/or a user's finger (e.g., occlusion 620 of FIGS. 6A-6B). In some examples, the occlusion detector 208 can use the hand tracking 222 to track hands as possible occlusions. In some examples, the occlusion detector 208 can use the touchscreen device tracking 224 to track the landmark pattern as depicted in images captured by the image sensor(s) 220 of the XR device 202, and identify when a portion of the landmark pattern is occluded by comparing the landmark pattern as depicted in the images captured by the image sensor(s) 220 of the XR device 202 to the (unoccluded) reference landmark pattern stored at the XR device 202. In some examples, the output image compositor 212 can track the occlusions to ensure that the occlusions are visible in the output image, for example by cutting out portions of the virtual interface and/or virtual content at the positions of the depicted occlusions, by overlaying depictions of the occlusions over the virtual portions of the virtual interface and/or virtual content at the positions of the depicted occlusions, or a combination thereof. For instance, in FIG. 6B, the occlusions 610 and 620 are still visible to the user 505 through the XR device 520. Similarly, in FIG. 8B, the occlusions 810 that partially occlude the virtual interface 835 are still visible to the user 505 through the XR device 520.

The output image compositor 212 can generate the output image by compositing the virtual interface (e.g., generated by the virtual interface generator 206) with the images captured by the image sensor(s) 220 of the XR device 202, by compositing the virtual content (e.g., generated by the virtual content generator 210) with the images captured by the image sensor(s) 220 of the XR device 202, by compositing occlusions (e.g., detected by the occlusion detector 208) with the virtual interfaces and/or virtual content, or a combination thereof. The XR device 202 can output the output image generated by the output image compositor 212 to one or more displays 234, thus displaying the output image (block 232) on the one or more displays 234. Displaying the output image (block 232) can be performed by the XR application 204 of the XR device 202, the displays 234, the output image compositor 212, a display controller associated with the displays 234, by the processors of the XR device 202, or a combination thereof. In an illustrative example, the XR device 202 can generate an output image based on the image of the scene and based on the pose and/or size of the display 260 of the display interface device 250 in the image data captured by the image sensors 220 of the XR device 202. For instance, the output image can be a modified variant of the captured image (captured by the image sensors 220 of the XR device 202) in which the XR device 202 overlays a virtual interface over the visual representation of the landmark pattern, in some cases replacing the visual representation of the landmark pattern with the virtual interface. The XR device 202 can position, orient, resize, rotate, skew, warp, and/or distort the virtual interface to have a virtual pose, simulated pose that is based on the recognized pose of the landmark pattern and/or the recognized pose of the display 260 of the display interface device 250. The XR device 202 can position, orient, resize, rotate, skew, warp, and/or distort the virtual interface to have a virtual size and/or simulated size that is based on the recognized size of the landmark pattern and/or the recognized size of the display 260 of the display interface device 250. The XR device 202 can display the output image to the user through one or more displays 234 of the XR device 250. Thus, to the user of the XR device 202, the virtual interface can appear to be displayed on the display 260 of the display interface device 250 on top of, and/or instead of, the landmark pattern.

In an illustrative example, a hand of a user of the XR device 202 can be occluding part of the landmark pattern from the perspective of the image sensor(s) 220. Because the landmark pattern is a known pattern (e.g., stored at as reference landmark pattern in the XR device 202), the XR device 202 can determine which parts of the landmark pattern are occluded and which parts of the landmark pattern are not occluded. Based on this, the output image compositor 212 of the XR device can generate the output image so that the virtual interface is occluded in the same way that the landmark pattern is occluded in the image(s) captured by the image sensor 220.

In some examples, the XR device 202 may include one or more other sensors than the inertial sensors 216 and image sensors 220 illustrated in FIG. 2. For example, the XR device 202 may include one or more light detection and ranging (LIDAR) sensors, radio detection and ranging (RADAR) sensors, sound detection and ranging (SODAR) sensors, sound navigation and ranging (SONAR) sensors, one or more time-of-flight (ToF) sensors, one or more structured light sensors, one or more microphones, one or more other sensors described herein, or combinations thereof. In some examples, sensor data from these sensors may also be used by the XR device 202 for inertial tracking 218, hand tracking 222, and/or touchscreen device tracking 224.

In some examples, the display interface device 250 includes one or more sensors 276. The one or more sensors 276 may include, for example, one or more image sensors (e.g., of cameras), accelerometers, gyroscopes, inertial measurement units (IMUs), light detection and ranging (LIDAR) sensors, radio detection and ranging (RADAR) sensors, sound detection and ranging (SODAR) sensors, sound navigation and ranging (SONAR) sensors, one or more time-offlight (ToF) sensors, one or more structured light sensors, one or more microphones, one or more other sensors described herein, or combinations thereof. The display interface device 250 may perform pose tracking 278 of the pose of the display interface device 250 using sensor data from the one or more sensors 276, for example as discussed above with respect to the inertial tracking 218 performed by the XR device 202. In some examples, the display interface device 250 may also perform pose tracking 278 of the pose of the XR device 202 using sensor data from the one or more sensors 276, for example based on representations of the XR device 202 detected in the sensor data from the one or more sensors 276. Performing the pose tracking 278 of the display interface device 250 and/or of the XR device 202 can be performed by the display interface application 252 of the display interface device 250, the sensors 278, a pose tracking engine of the display interface device 250, by the processors of the display interface device 250, or a combination thereof.

In some examples, the display interface device 250 may send pose tracking data (e.g., identifying a pose and/or size of the display interface device 250 (and/or the display 260 thereof) and/or a pose and/or size of the XR device 202) from the display interface device 250 to the XR device 202 using the one or more wireless transceivers 270 (block 272). Sending the pose tracking data (block 272) can be performed by the display interface application 252 of the display interface device 250, the wireless transceiver(s) 270, by the processors of the display interface device 250, or a combination thereof. In some examples, the XR device 202 may receive the pose tracking data (e.g., identifying the pose and/or size of the display interface device 250 (and/or the display 260 thereof) and/or the pose and/or size of the XR device 202) from the display interface device 250 using the one or more wireless transceivers 230 (block 228). Receiving the pose tracking data (block 228) can be performed by the XR application 204 of the XR device 202, the wireless transceiver(s) 230, by the processors of the XR device 202, or a combination thereof. In some examples, the pose tracking data (e.g., identifying the pose of the display interface device 250 and/or the pose of the XR device 202) received by the XR device 202 from the display interface device 250 (at block 228) may be used by the XR device 202 for inertial tracking 218, hand tracking 222, and/or touchscreen device tracking 224.

As discussed above, the display interface device 250 can detect and interpret display interface inputs through the display 260 and/or display interface 261 (e.g., touch inputs through a touchscreen display interface 261 of the display 260). The display interface device 250 can identify the display interface inputs and send (block 272) the display interface input identifiers to the XR device 202, for example in the form of one or more coordinates on a coordinate grid of the display 260 and/or display interface 261 that have been touched, clicked, swiped, hovered over, gestured over, or that have otherwise received a display interface input to the display interface 261. Sending the display interface inputs (block 272) can be performed by the display interface application 252 of the display interface device 250, the wireless transceiver(s) 270, by the processors of the display interface device 250, or a combination thereof. The XR device 202 can receive (block 228) the display interface input identifiers. Receiving the display interface inputs (block 228) can be performed by the XR application 204 of the XR device 202, the wireless transceiver(s) 230, by the processors of the XR device 202, or a combination thereof. The XR device 202 can adjust output content to be output (e.g., displayed on displays 234) to the user by the XR device 202 based on the display interface inputs. If the position of the display interface input algins with (e.g., overlaps with and/or matches) the position of an interface element of the virtual interface, the XR device 202 can identify that the display interface input has activated or otherwise interacted with the interface element of the virtual interface. In some examples, the display interface input identifier can identify that the position of the display interface input aligns with (e.g., overlaps with and/or matches) a specific portion of the landmark pattern, and the XR device 202 can identify that the position of the display interface input aligns with (e.g., overlaps with and/or matches) a corresponding portion of the virtual interface that is overlaid over the specific portion of the landmark pattern. The output content can include the output image, future output images, one or more audio clips (e.g., music, sound effects), vibratory feedback (e.g., haptic feedback, rumble feedback), that the XR device 202 is to output to the user, or combinations thereof. Changes to the output content can include changed to the output image, changes to future output images, changes to audio clip that the XR device 202 is to output to the user, changes to the vibratory feedback (e.g., to the pattern of the vibration), or combinations thereof.

In an illustrative example, if the XR device 202 determines, based on the display interface input, that the user has pressed a pause button on the virtual interface, the XR device can pause video playback at the current video frame. If the XR device 202 determines, based on the display interface input, that the user has pressed a fast-forward button on the virtual interface, the XR device 202 can start fast-forwarding playback starting from the next output frame. If the XR device 202 determines, based on the display interface input, that the user has moved a volume slider, the XR device 202 can adjust the volume of audio that the XR device 202 is outputting to the user starting from a next segment of audio.

Figure 9:
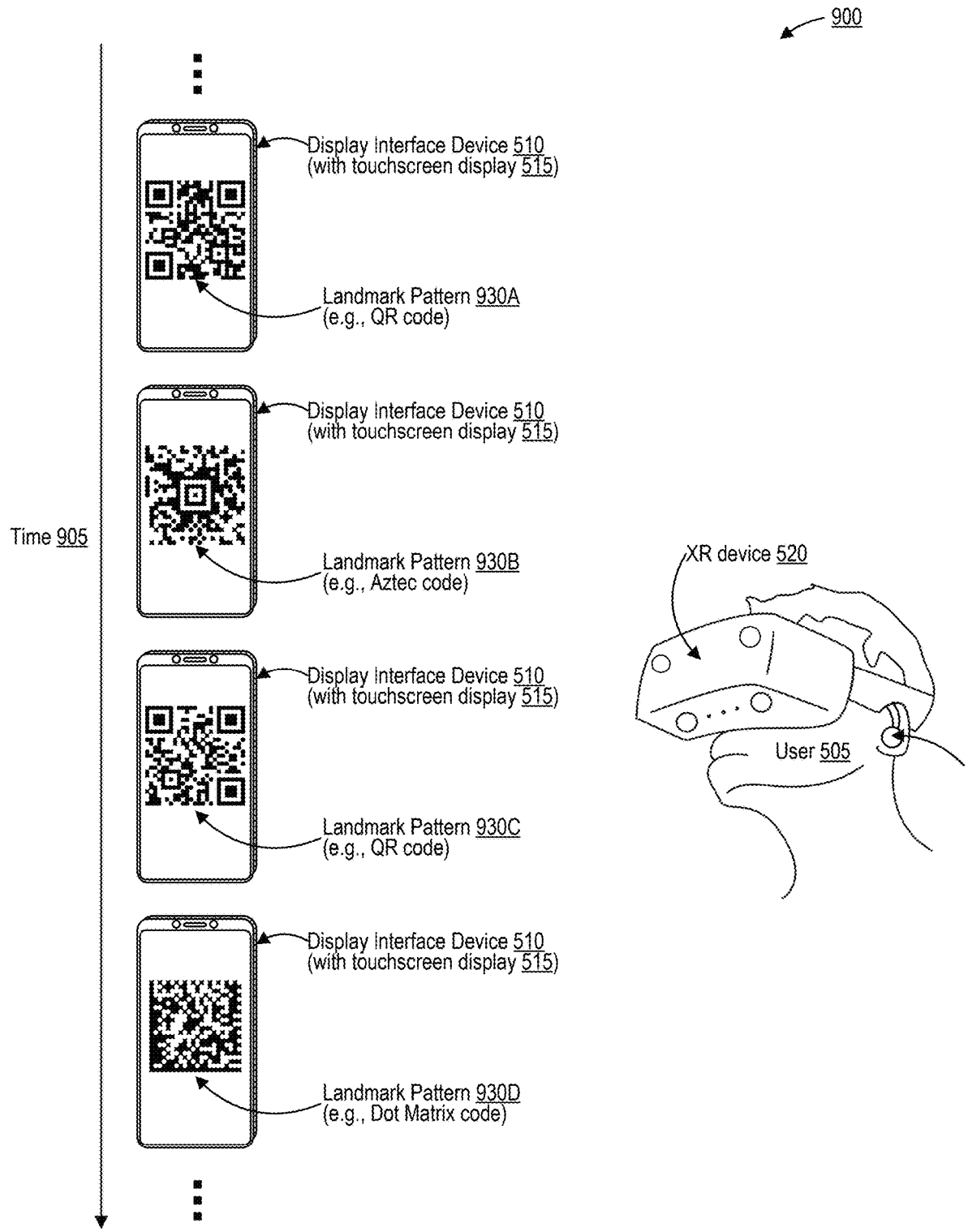
FIG. 9 is a conceptual diagram illustrating a display interface device switching between displaying a plurality of different landmark patterns over time, in accordance with some examples.

In some examples, the display interface device 250 is configured to shift between displaying each of a set of different landmark patterns on the display interface device 250 at a predetermined frequency over time 905, as illustrated in FIG. 9. By detecting which landmark pattern of the set of different landmark patterns is depicted in the image, and lining that up with the time at which the display interface device 250 displayed that landmark pattern on the display 260, the XR device 202 and display interface device 250 can synchronize timings. The XR device 202 can obtain a more accurate indication of when a particular display interface input was received at the display interface device 250 relative to what the XR device 202 is displaying as the virtual interface based on which landmark pattern the XR device 202 is overlaying the virtual interface over, increasing precision of the display interface inputs for use by the XR device.

In some cases, the XR device 202 can also use hand tracking 222 and/or finger tracking for inputs instead of, or in addition to, receipt of the display interface inputs from the display interface 261 of the display interface device 250. For example, the XR device 202 can use a touch input detected by a touchscreen-based display interface 261 of the display interface device 250 as a first type of input, and can use a hand-tracking-based detection of the user pointing to an element of the virtual interface as a second type of input, for instance performed as in the hand tracking 218. The hand tracking input can be a fallback option, for example if the display interface 261 of the display interface device 250 is defective and/or cannot reliably detect display interface inputs (e.g., touchscreen-based display interface 261 is wet). The hand tracking input can be a different type of input, for example allowing a user to point at and/or hover over an interface element of the virtual interface and/or display interface without actually touching the interface element, and for this pointing and/or hovering to be detected and interpreted as an interaction with the interface element. The hand tracking can include finger tracking. The hand tracking can be based on data from the inertial sensors 216, the image sensors 220, the sensors 276 of the display interface device 250, or a combination thereof. In some examples, the hand tracking can be based on data from one or more cameras and/or one or more range sensors (e.g., a RADAR sensor, a LIDAR sensor, a SONAR sensor, a SODAR sensor, a time of flight sensor, a structured light sensor) of the XR device 202 and/or of the display interface device 250.

Figure 3A:
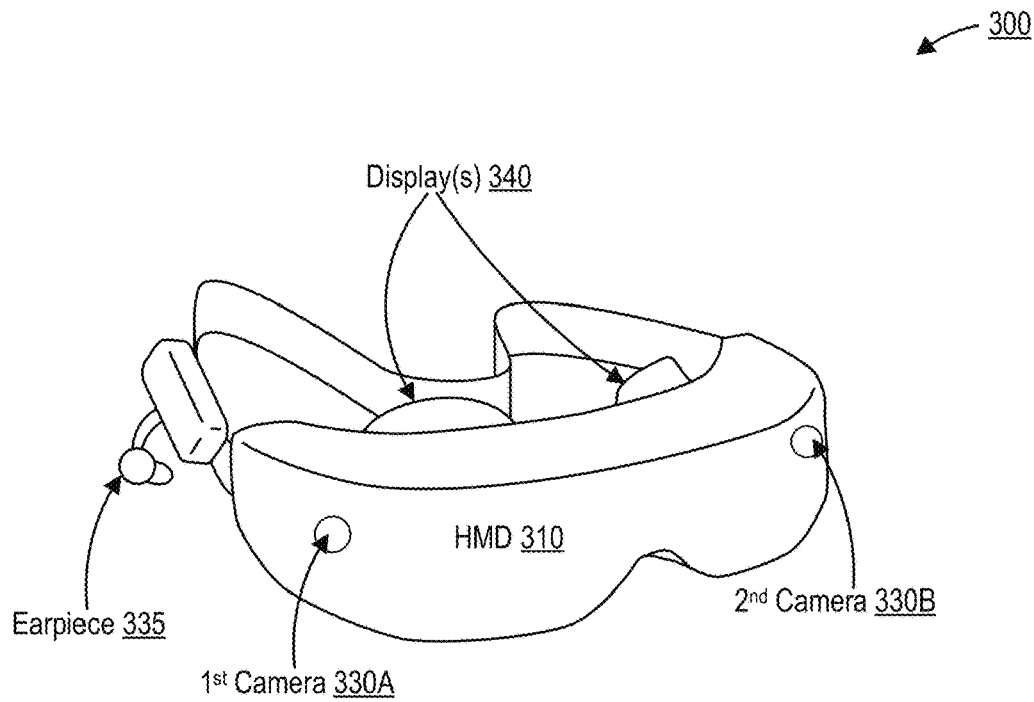
FIG. 3A is a perspective diagram illustrating a head-mounted display (HMD) that is used as an extended reality (XR) system, in accordance with some examples.

FIG. 3A is a perspective diagram 300 illustrating a head-mounted display (HMD) 310 that is used as an extended reality (XR) device 202. The HMD 310 may be, for example, an augmented reality (AR) headset, a virtual reality (VR) headset, a mixed reality (MR) headset, an extended reality (XR) headset, or some combination thereof. The HMD 310 may be an example of an XR device 202. The HMD 310 includes a first camera 330A and a second camera 330B along a front portion of the HMD 310. The first camera 330A and the second camera 330B may include the image sensors 220 of the XR device 202. In some examples, the HMD 310 may only have a single camera with a single image sensor 220. In some examples, the HMD 310 may include one or more additional cameras in addition to the first camera 330A and the second camera 330B, which may also include image sensor 220 of the XR device 202. In some examples, the HMD 310 may include one or more additional sensors in addition to the first camera 330A and the second camera 330B, which may also be examples of the inertial sensors 216 of the XR device 202 and/or other sensors of the XR device 202 described herein.

The HMD 310 may include one or more displays 340 that are visible to a user 320 wearing the HMD 310 on the user 320's head. The one or more displays 340 of the HMD 310 can be examples of the displays 234 of the XR device 202. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the left eye of the user 320 sees a right side of the display. In some examples, the HMD 310 may include two displays 340, including a left display that displays content to the user 320's left eye and a right display that displays content to a user 320's right eye.

Figure 3B:
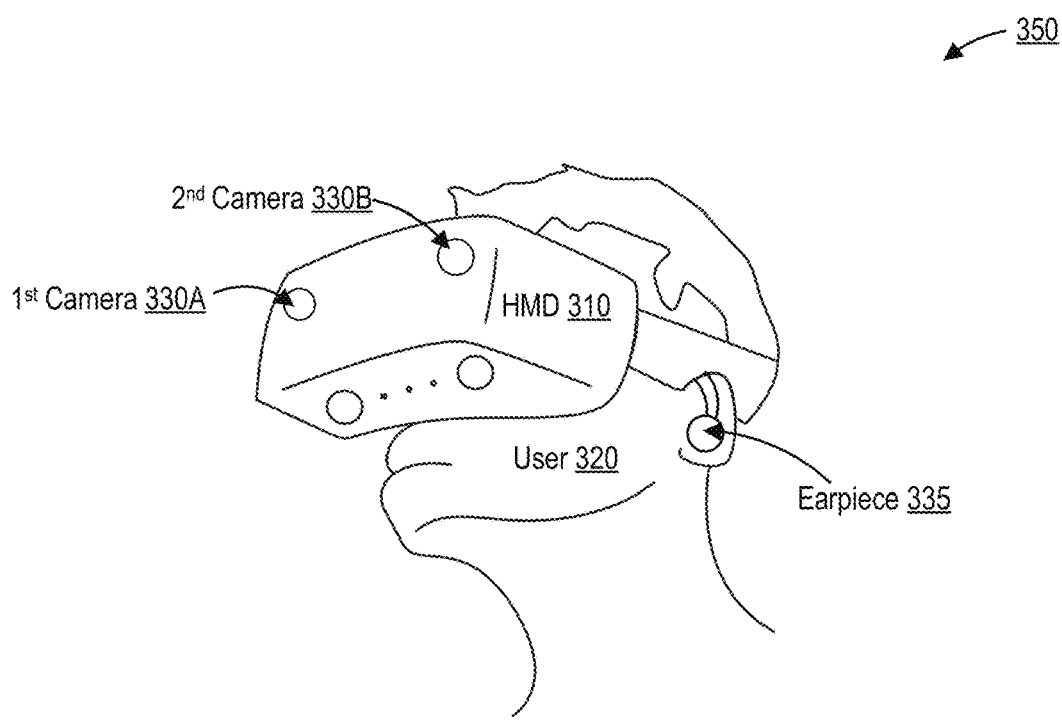
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes. The output images may be examples of the display output images 232. The output images can be based on the images captured by the first camera 330A and the second camera 330B. The output images may provide a stereoscopic view of the environment, in some cases with information overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid information in the display images overlaid over the images captured by the first camera 330A and the second camera 330B. An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

Figure 4A:
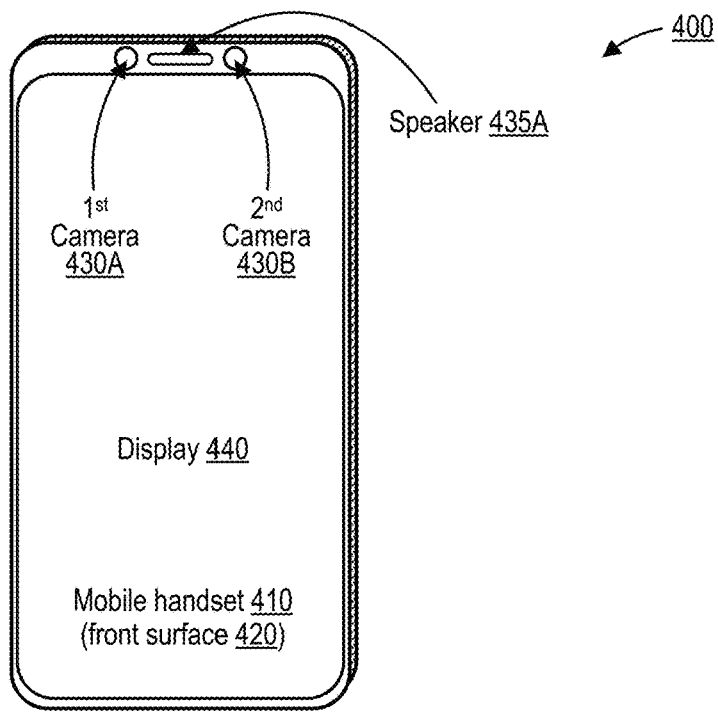
FIG. 4A is a perspective diagram illustrating a front surface of a mobile handset that includes front-facing cameras and that can be used as an extended reality (XR) device or as a touchscreen device, in accordance with some examples.

FIG. 4A is a perspective diagram 400 illustrating a front surface of a mobile handset 410 that includes front-facing cameras and can be used as an extended reality (XR) device 202 or as a display interface device 250. The mobile handset 410 may be an example of a XR device 202. The mobile handset 410 may be an example of a display interface device 250. The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B may be examples of the image sensors 220 of the XR device 202. The first camera 430A and the second camera 430B may be examples of the sensors 276 of the display interface device 250. The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. The first camera 430A and the second camera 430B may be the sensor 405A and the sensor 405B, respectively. In some examples, the front surface 420 of the mobile handset 410 may only have a single camera. In some examples, the mobile handset 410 may include one or more additional cameras in addition to the first camera 430A and the second camera 430B. The one or more additional cameras may also be examples of the image sensors 220 of the XR device 202. The one or more additional cameras may also be examples of the sensors 276 of the display interface device 250. In some examples, the mobile handset 410 may include one or more additional sensors in addition to the first camera 430A and the second camera 430B. The one or more additional sensors may also be examples of the inertial sensors 216 of the XR device 202 and/or other sensors of the XR device 202. The one or more additional sensors may also be examples of the sensors 276 of the display interface device 250. The front surface 420 of the mobile handset 410 also includes a display 440. In some cases, the front surface 420 of the mobile handset 410 includes more than one display 440. The one or more displays 440 of the front surface 420 of the mobile handset 410 can be examples of the display(s) 234 of the XR device 202. The one or more displays 440 of the front surface 420 of the mobile handset 410 can be examples of the display(s) 260 and/or display interface(s) 261 of the display interface device 250. For example, the one or more displays 440 can include one or more touchscreen displays, with the touchscreen interface of the touchscreen displays representing a display interface 261 of the touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). In some examples, the audio output by the mobile handset 410 to the user through the one or more speakers 435A and/or other audio output devices may include, or be based on, audio recorded using the one or more microphones.

Figure 4B:
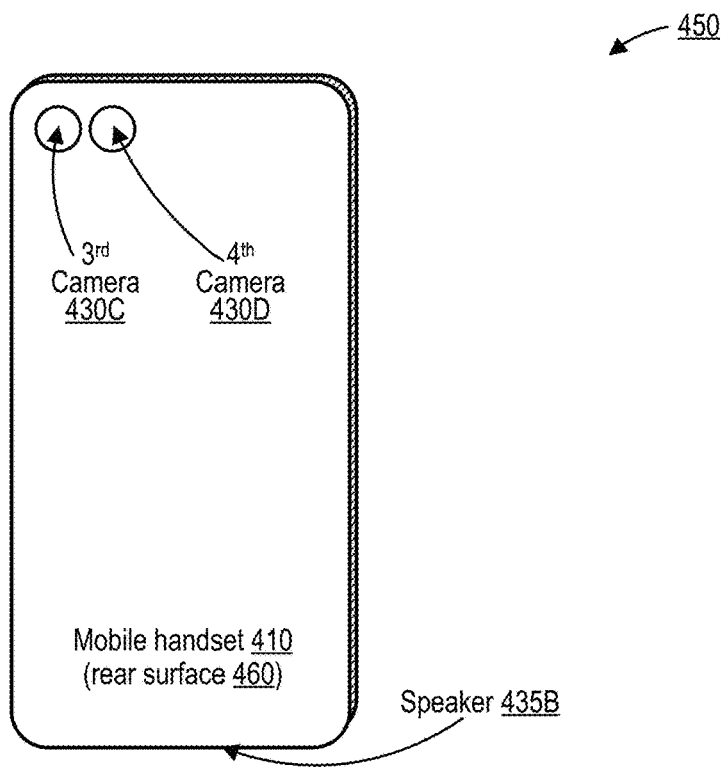
FIG. 4B is a perspective diagram illustrating a rear surface of a mobile handset that includes rear-facing cameras and can be used as an extended reality (XR) device or as a display interface device, in accordance with some examples.

FIG. 4B is a perspective diagram 450 illustrating a rear surface 460 of a mobile handset that includes read-facing cameras and can be used as an extended reality (XR) device 202 or as a display interface device 250 of FIG. 2. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the image sensors 220 of the XR device 202 of FIG. 2. The third camera 430C and the fourth camera 430D may be examples of the sensors 276 of the display interface device 250 of FIG. 2. The third camera 430C and the fourth camera 430D face a direction perpendicular to a planar surface of the rear surface 460 of the mobile handset 410. While the rear surface 460 of the mobile handset 410 does not have a display 440 as illustrated in the perspective diagram 450, in some examples, the rear surface 460 of the mobile handset 410 may include one or more rear displays. The one or more rear displays of the rear surface 460 of the mobile handset 410 can be examples of the display(s) 234 of the XR device 202. The one or more rear displays of the rear surface 460 of the mobile handset 410 can be examples of the display interface display(s) 260 of the display interface device 250. If the rear surface 460 of the mobile handset 410 includes one or more rear displays, any positioning layouts of the third camera 430C and the fourth camera 430D relative to the one or more rear displays may be used as discussed with respect to the first camera 430A and the second camera 430B relative to the display 440 of the front surface 420 of the mobile handset 410.

The third camera 430C and the fourth camera 430D may be two of the one or more cameras of the mobile handset 410. In some examples, the rear surface 460 of the mobile handset 410 may only have a single camera. In some examples, the mobile handset 410 may include one or more additional cameras in addition to the first camera 430A, the second camera 430B, the third camera 430C, and the fourth camera 430D. The one or more additional cameras may also be examples of the image sensors 220 of the XR device 202. The one or more additional cameras may also be examples of the sensors 276 of the display interface device 250. In some examples, the mobile handset 410 may include one or more additional sensors in addition to the first camera 430A, the second camera 430B, the third camera 430C, and the fourth camera 430D. The one or more additional sensors may also be examples of the inertial sensors 216 of the XR device 202 and/or other sensors of the XR device 202. The one or more additional sensors may also be examples of the sensors 276 of the display interface device 250.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). In some examples, the audio output by the mobile handset 410 to the user through the one or more speakers 435B and/or other audio output devices may include, or be based on, audio recorded using the one or more microphones.

Figure 5A:
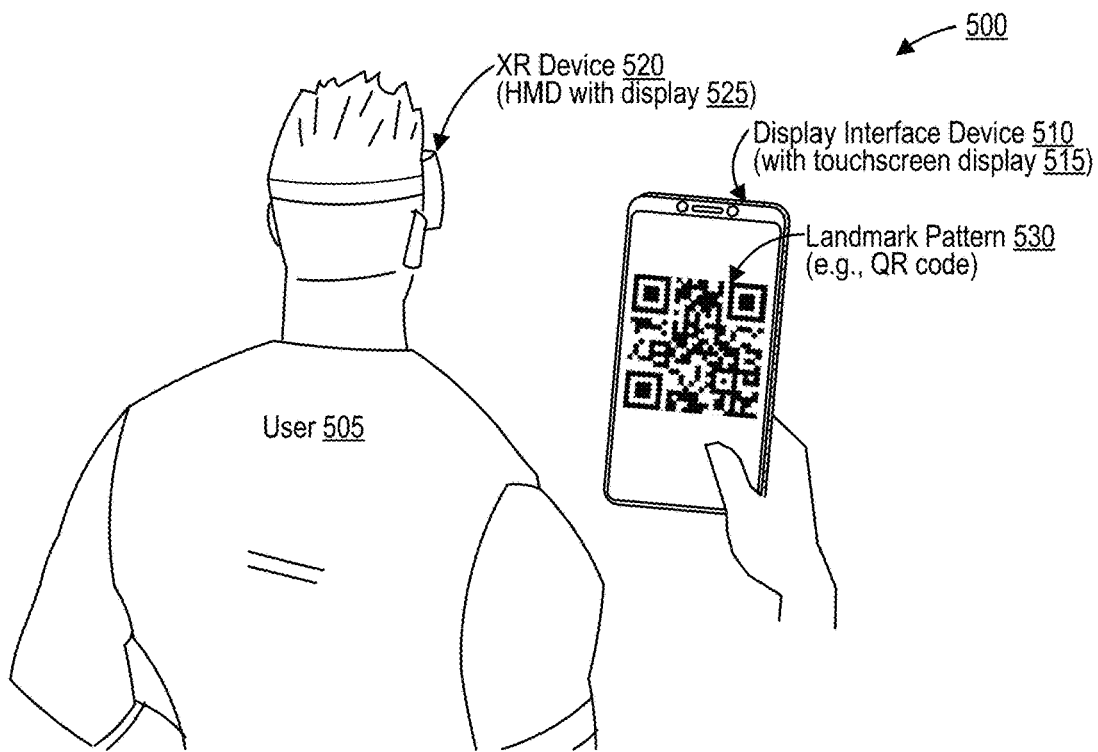
FIG. 5A is a perspective diagram illustrating a user wearing an extended reality (XR) device and holding a display interface device that is displaying a landmark pattern, in accordance with some examples.

FIG. 5A is a perspective diagram 500 illustrating a user 505 wearing an extended reality (XR) device 520 and holding a display interface display interface device 510 that is displaying a landmark pattern 530, in accordance with some examples. The XR device 520 worn by the user 505 may be an HMD 310 of FIGS. 3A-3B that may include one or more displays 525 of FIG. 5A-9, which may be examples of the one or more displays 234 of FIG. 2, the one or more displays 340 of FIGS. 3A-3B, or both. The XR device 520 is illustrated as an HMD 310 of FIGS. 3A-3B for the sake of illustration, and it should be understood that the XR device 520 may be a mobile handset 410 of FIGS. 4A-4B instead.

Figure 5B:
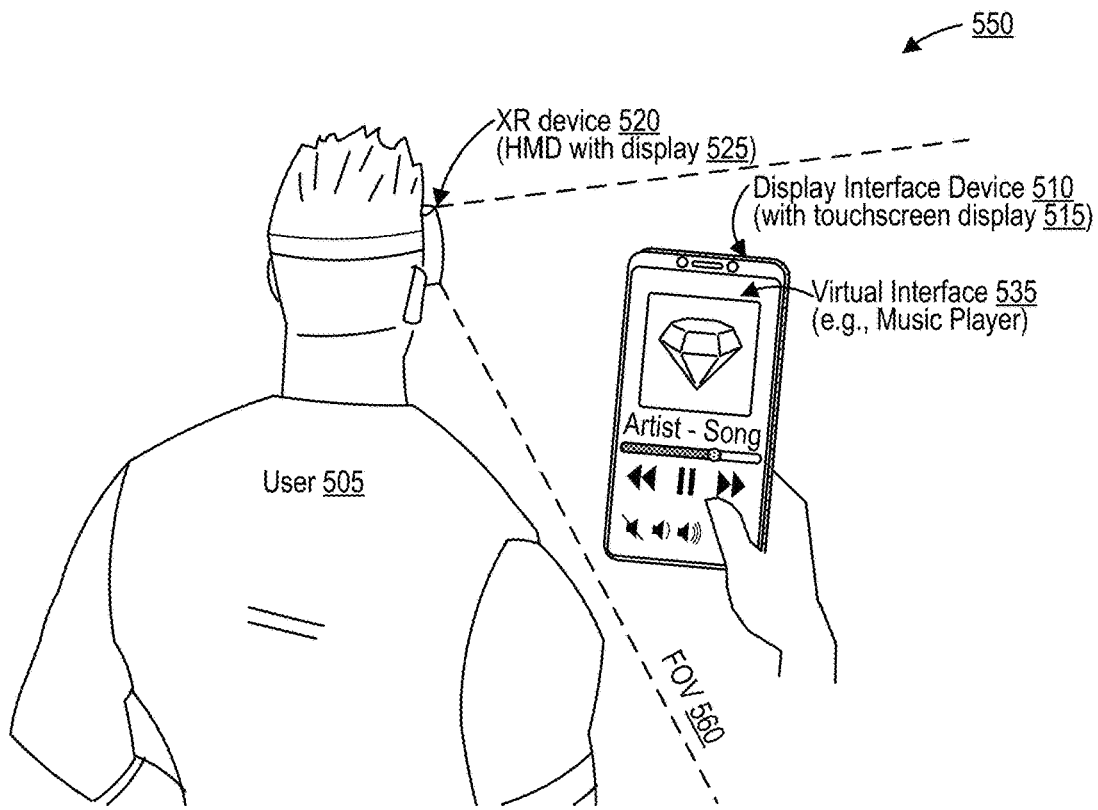
FIG. 5B is a perspective diagram illustrating a field of view (FOV) of the user wearing and viewing the environment through the extended reality (XR) device of FIG. 5A, in which a virtual interface is overlaid over the landmark pattern, in accordance with some examples.

The display interface device 510 includes a touchscreen display 515 that is illustrated displaying a landmark pattern 530, which is illustrated as a QR code. The display interface device 510 of FIGS. 5A-5B, 6A-6B, 7A-7B, 8A-8B, and 9 is an example of a display interface device 250. The touchscreen display 515 of FIGS. 5A-5B, 6A-6B, 7A-7B, 8A-8B, and 9 is an example of both a display 260 of a display interface device 250 and a display interface 261 of a display interface device 250. For instance, the display layer(s) of the touchscreen display 515 are examples of the display 260, while the touch-sensitive layer(s) and/or touch-sensing layers of the touchscreen display 515 are examples of the display interface 261. In this example, touch inputs to the touchscreen display 515 of the display interface device 510 are examples of display interface inputs to the display interface 261 of the display interface device 250. The landmark pattern 530 is what is actually displayed on the touchscreen display 515 of the display interface display interface device 510 in FIG. 5A. Thus, to anyone in the environment other than the user 505 (who is viewing the environment through the XR device 520), the display interface display 515 of the display interface display interface device 510 appears to display the landmark pattern 530. Thus, anyone in the environment other than the user 505 (who is viewing the environment through the XR device 520) cannot see the virtual interface 535, while the user 505 (who is viewing the environment through the XR device 520) can see the virtual interface 535 through the XR device 520 as illustrated in FIG. 5B. The pose of the XR device 520 from the perspective of the XR device 520 (and any input image captured by the XR device 520), and thus the pose of the landmark pattern 530 displayed on the touchscreen display 515 of the XR device 520 from the perspective of the XR device 520 (and any input image captured by the XR device 520), appears rotated slightly clockwise.

FIG. 5B is a perspective diagram 550 illustrating a field of view (FOV) 560 of the user 505 wearing and viewing the environment through the extended reality (XR) device 520 of FIG. 5A, in which a virtual interface 535 is overlaid over the landmark pattern 530, in accordance with some examples. The virtual interface 535 is a music player virtual interface, and includes album art, an artist title and a song title. The virtual interface 535 also include interactive interface elements, including a scrubbing slider, a pause/play button, a rewind button, a fast-forward button, a volume up button, a volume down button, and a mute button. Interaction with the touchscreen display 515 of the display interface device 510 can cause the display interface device 510 to send touch input identifiers to the XR device 520 identifying what portion(s) of the touchscreen display 515 were touched during the touch inputs, and/or how they were touched during the touch inputs (e.g., tap, double tap, triple tap, swipe, long press, gesture, multi-finger variants of any of the previously listed touch inputs, or combinations thereof), allowing the XR device 520 to identify if any of the interactive interface elements of the virtual interface 535 of the XR device 520 were touched during the touch inputs. Because the pose of the XR device 520 from the FOV 560, and thus the pose of the landmark pattern 530 displayed on the touchscreen display 515 of the XR device 520 from the FOV 560, appears rotated slightly clockwise, the virtual interface 535 is also rotated slightly clockwise to appear aligned with the pose of the XR device 520 and/or of the touchscreen display 515 and/or of the landmark pattern 530.

FIG. 6A is a perspective diagram 600 illustrating a user 505 wearing an extended reality (XR) device 520 and holding a display interface device 510 that is displaying two landmark patterns 630 that are partially occluded by occlusions 610 and 620, including the user 505's hands and fingers, in accordance with some examples. The display interface device 510 displays, on its touchscreen display 515, two landmark patterns 630, which are each illustrated as a QR code. Several regions of the touchscreen display 515, including regions of the two landmark patterns 630, are partially occluded by a first occlusion 610 (the user 505's left hand and/or the fingers of the user 505's left hand) and a second occlusion 620 (a finger of the user 505's right hand). The XR device 520 can detect that the first occlusion 610 and the second occlusion 620 are partially occluding the regions of the touchscreen display 515 (e.g., including regions of the two landmark patterns 630) at least in part by comparing representations of the two landmark patterns 630 (and/or of the touchscreen display 515 generally) in images captured by image sensors of the XR device 520 to reference landmark patterns (and/or a reference copy of the content displayed on the touchscreen display 515) corresponding to the two landmark patterns 630 (and/or other content displayed on the touchscreen display 515) that are stored by the XR device 520. To anyone in the environment other than the user 505 (who is viewing the environment through the XR device 520), the touchscreen display 515 of the display interface device 510 displays the landmark patterns 630.

FIG. 6B is a perspective diagram 650 illustrating a field of view (FOV) 660 of the user 505 wearing and viewing the environment through the extended reality (XR) device 520 of FIG. 6A, in which a virtual interface 635 is overlaid over the two landmark patterns 630 and the occlusions 610 and 620 are visible over the virtual interface 635, in accordance with some examples. The virtual interface 635 is an image viewer virtual interface, and includes a column of images that can be scrolled through interactively using touch inputs. In some examples, tapping on an image may increase the size of the image and/or display metadata for the image. Interaction with the touchscreen display 515 of the display interface device 510 can cause the display interface device 510 to send touch input identifiers to the XR device 520 identifying what portion(s) of the touchscreen display 515 (and how they) were touched during the touch inputs, allowing the XR device 520 to identify parts of the virtual interface 635 that were touched during the touch inputs. In one illustrative example, the touch input identifiers to the XR device 520 can identifying swiping or sliding touch gestures that can cause the XR device 520 to scroll through the images in the virtual interface 635. In another illustrative example, the touch input identifiers to the XR device 520 can identifying tapping or pressing touch inputs on a particular image of the virtual interface 635, which can cause the XR device 520 to increase the size of the image and/or display metadata for the image.

The first occlusion 610 and the second occlusion 620 are still visible in the FOV 660 to the user 505 as occlusions of the virtual interface 635. The XR device 520 can, in some examples, cut out portions of the virtual interface 635 at the positions of the first occlusion 610 and the second occlusion 620 before overlaying the virtual interface 635 over the landmark patterns 630. The XR device 520 can, in some examples, overlay the virtual interface 635 over the landmark patterns 630, and then overlay image data corresponding to the first occlusion 610 and the second occlusion 620 over the virtual interface 635.

In some examples, the XR device 520 has knowledge of the expected landmark pattern 630. Any disparity between the expected landmark pattern 630 and the observed landmark pattern 630 in images captured by the image sensors 220 of the XR device 520 can aid the XR device 520 in performing occlusion detection. This disparity calculation can be used alone for occlusion detection or as an input to one or more trained neural networks to identify the occlusions. Occlusion detection can allow detailed and appropriate rendering of the virtual interface 635 and/or other virtual content from the XR device 520 with appropriate occlusion.

Figure 7A:
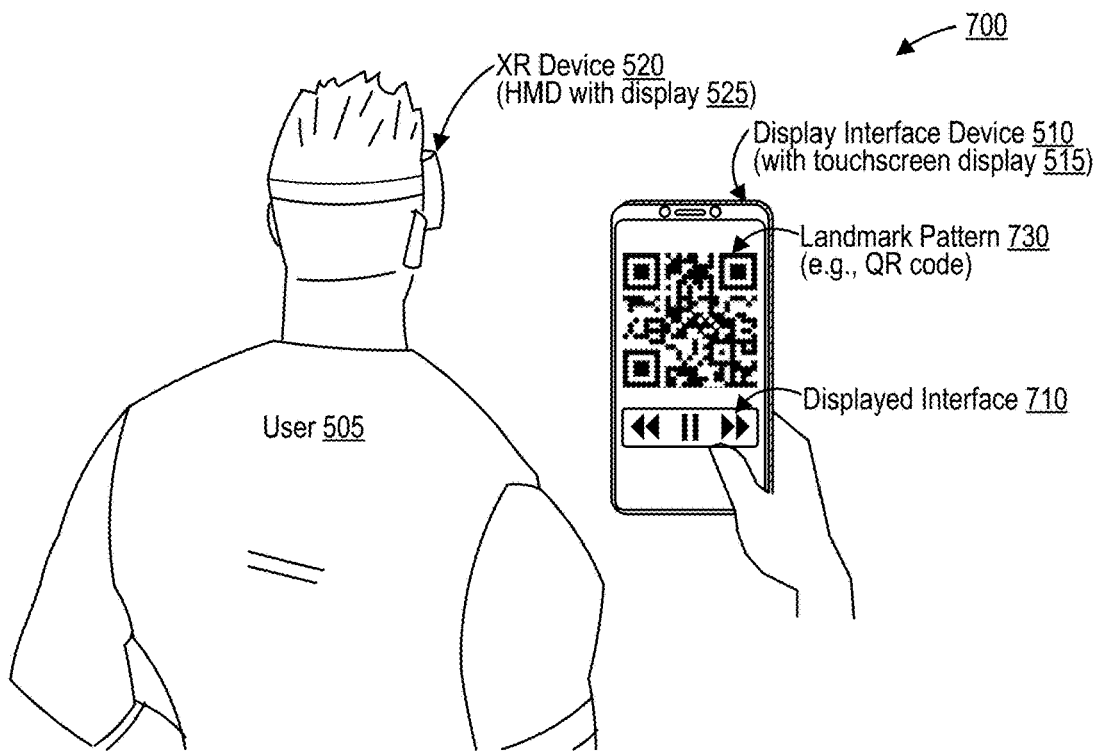
FIG. 7A is a perspective diagram illustrating a user wearing an extended reality (XR) device and holding a display interface device that is displaying a landmark pattern and a displayed interface, in accordance with some examples.
Figure 7B:
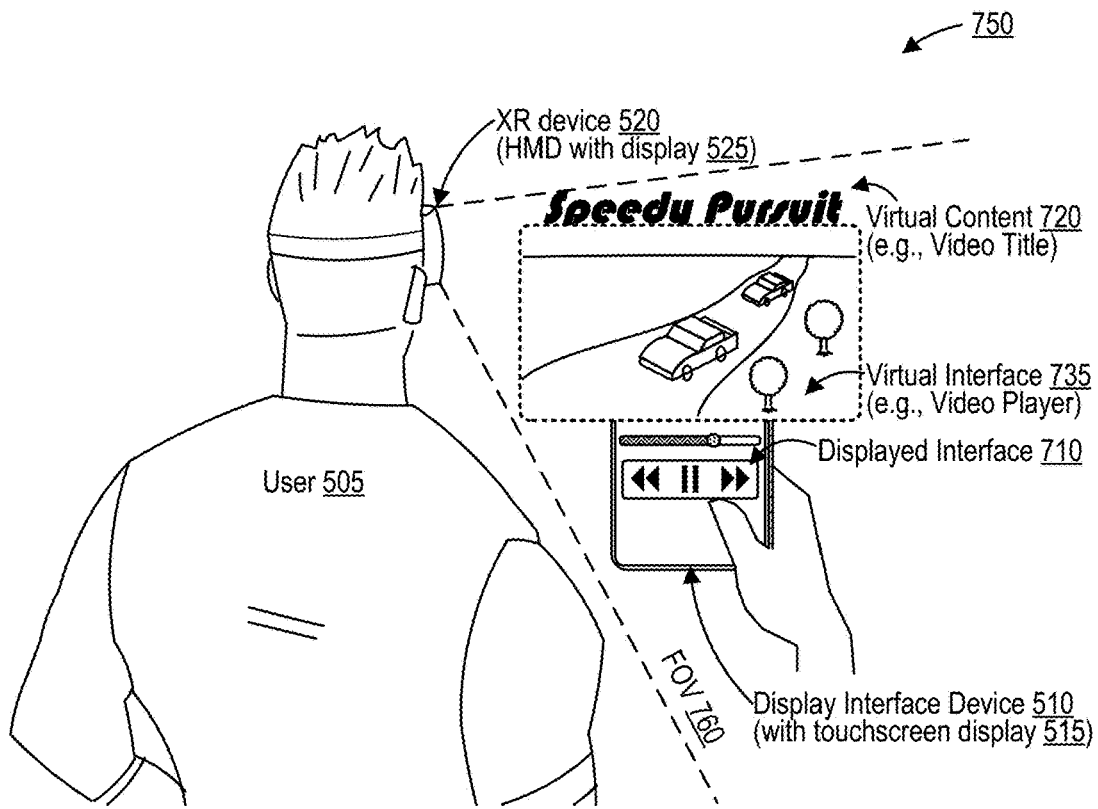
FIG. 7B is a perspective diagram illustrating a field of view (FOV) of the user wearing and viewing the environment through the extended reality (XR) device of FIG. 7A, in which a virtual interface is overlaid over the landmark pattern but the displayed interface is still visible, in accordance with some examples.

FIG. 7A is a perspective diagram 700 illustrating a user 505 wearing an extended reality (XR) device 520 and holding a display interface device 510 that is displaying a landmark pattern 530 and a displayed interface 710, in accordance with some examples. The display interface device 510 displays, on its touchscreen display 515, the landmark pattern 730 (which is illustrated as a QR code) and the displayed interface 710. The displayed interface 710 includes a play/pause button, a rewind button, and a fast-forward button. To anyone in the environment other than the user 505 (who is viewing the environment through the XR device 520), the touchscreen display 515 of the display interface device 510 displays the landmark pattern 730 and the displayed interface 710.

FIG. 7B is a perspective diagram 750 illustrating a field of view (FOV) 760 of the user 505 wearing and viewing the environment through the extended reality (XR) device 520 of FIG. 5A, in which a virtual interface 735 is overlaid over the landmark pattern 730 but the displayed interface 710 is still visible, in accordance with some examples. The virtual interface 735 is a video player virtual interface, and includes a video that is playing. The virtual interface 735 also include interactive interface elements, including a scrubbing slider. The displayed interface 710 is still visible to the user 505, as the XR device 520 does not overlay anything over the displayed interface 710 or replace the displayed interface 710 with anything. The displayed interface 710 includes the play/pause button that can play or pause playback of the video, the rewind button that can rewind playback of the video, and the fast-forward button that can fast-forward playback of the video.

Interaction with the touchscreen display 515 of the display interface device 510 can cause the display interface device 510 to send touch input identifiers to the XR device 520 identifying what portion(s) of the touchscreen display 515 were touched during the touch inputs, and how they were touched during the touch inputs, allowing the XR device 520 to identify if any of the interactive interface elements of the virtual interface 735 (e.g., the scrubbing slider) of the XR device 520 were touched during the touch inputs. Interaction with the touchscreen display 515 of the display interface device 510 can also cause the display interface device 510 to detect any interactions with interface elements of the displayed interface, which the display interface device 510 can send to the XR device 520 as touch input identifiers that allow the XR device 520 to know, for instance, whether the touch input interacted with the play/pause button (causing the XR device 520 to play or pause playback of the video), the rewind button (causing the XR device 520 to rewind playback of the video), and the fast-forward button (causing the XR device 520 to fast-forward playback of the video).

The video, as displayed to the user 505, is larger than the display interface device 510 and is not confined to the boundaries of the touchscreen display 515, but can still be positioned and/or oriented based on the pose of the landmark pattern 730 and/or of the touchscreen display 515 of the display interface device 510. Additional virtual content 720 is also displayed in the FOV 760, including a title ("Speedy Pursuit") of the video being played using the video player virtual interface 735.

In some examples, the touch-based interface for the XR system 200 may thus include a mixture of XR-device-520-rendered virtual content (e.g., the virtual interface 735 and/or other virtual content 720) and the displayed interface 710 rendered by the display interface device 510. In some examples, it may save power and/or other computing resources to render some elements (e.g., the displayed interface 710) on display interface device 510. For instance, it may save power and/or other computing resources for complex 3D content to be rendered on the touch-screen device, as such content may be difficult to accurately modify to match a pose of the landmark pattern 730. On the other hand, it may save power and/or other computing resources for very clear and simple content to be rendered on the touch-screen device, as such content may be clearly visible and discernable through the XR device 520 even with any degradation or image artifacts caused by recording the touchscreen display 515 using the image sensor(s) 220 of the XR device 520. Some use cases may involve having some content visible on the touch-screen device to other people in the environment (who may or may not be wearing XR devices themselves) while some other portion of the content should be visible only to the device owner (wearing the XR device 520).

Figure 8A:
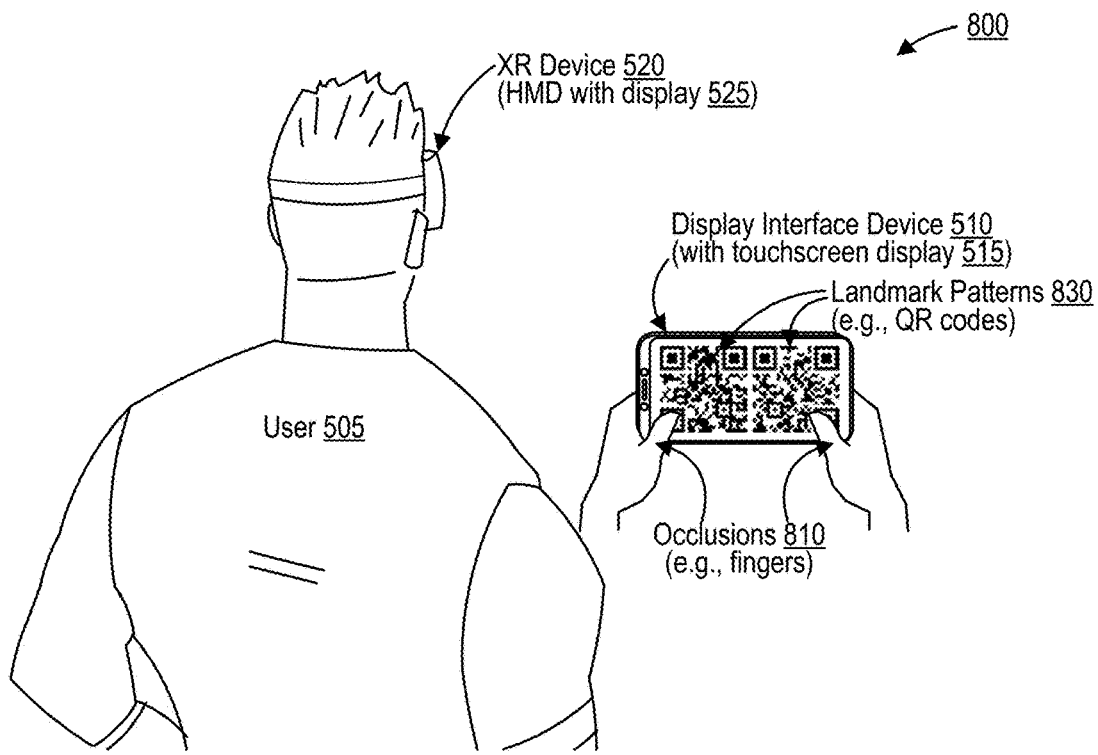
FIG. 8A is a perspective diagram illustrating a user wearing an extended reality (XR) device and holding a display interface device that is displaying two landmark patterns, in accordance with some examples.

FIG. 8A is a perspective diagram 800 illustrating a user 505 wearing an extended reality (XR) device 520 and holding a display interface device 510 that is displaying two landmark patterns 830, in accordance with some examples. The display interface device 510 displays, on its touchscreen display 515, two landmark patterns 830, which are each illustrated as a QR code. The two landmark patterns 830 are partially occluded by two occlusions 810 (fingers of the user 505's left hand and right hand, respectively). The XR device 520 can detect that the occlusions 810 are partially occluding the two landmark patterns 830 by comparing representations of the two landmark patterns 830 in images captured by image sensors of the XR device 520 to reference landmark patterns corresponding to the two landmark patterns 830 that are stored by the XR device 520. To anyone in the environment other than the user 505 (who is viewing the environment through the XR device 520), the touchscreen display 515 of the display interface device 510 displays the landmark patterns 830.

Figure 8B:
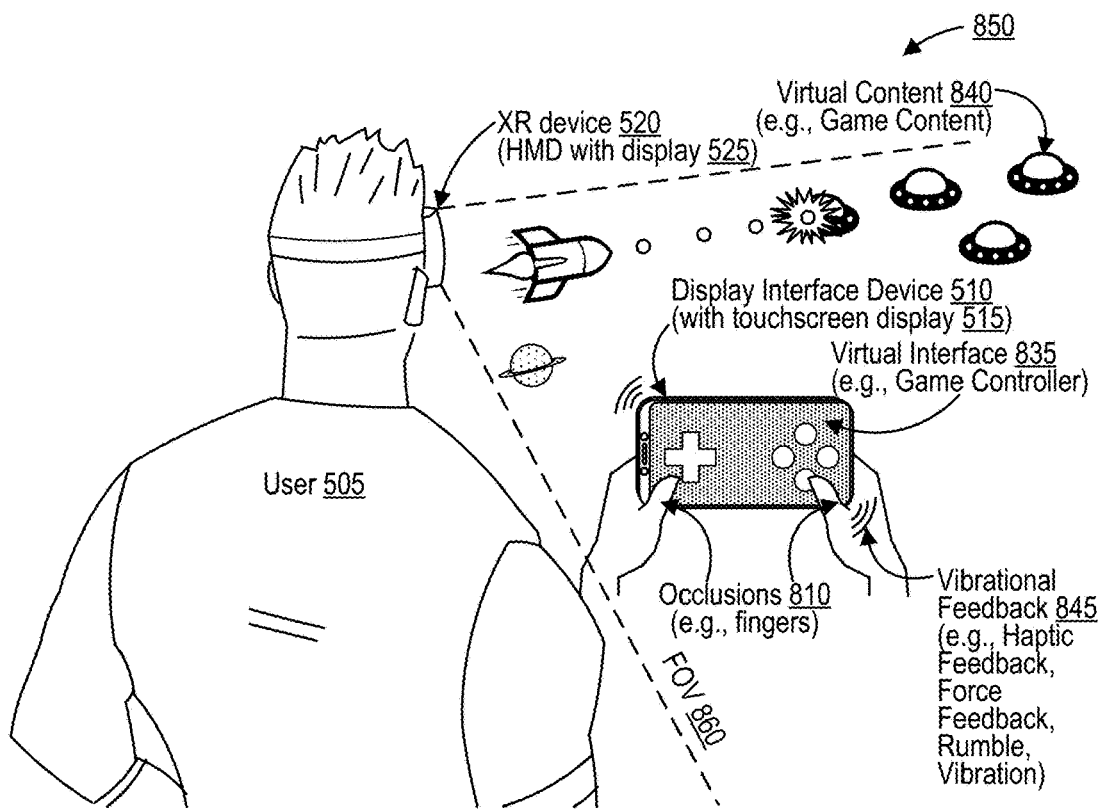
FIG. 8B is a perspective diagram illustrating a field of view (FOV) of the user wearing and viewing the environment through the extended reality (XR) device of FIG. 8A, in which a virtual interface is overlaid over the two landmark patterns, in accordance with some examples.

FIG. 8B is a perspective diagram 850 illustrating a field of view (FOV) 860 of the user 505 wearing and viewing the environment through the extended reality (XR) device 520 of FIG. 8A, in which a virtual interface 835 is overlaid over the two landmark patterns 830, in accordance with some examples. The virtual interface 835 is a video game controller virtual interface, and includes interactive interface elements including four buttons and a directional pad (D-pad). Virtual content 840 is also displayed in the FOV 860, including video game content. The virtual content 840 (the video game content) illustrates a rocketship (representing a player character) flying the through space and firing a laser gun at four flying saucers (representing enemies), and hitting one of the flying saucers with the laser gun. In some examples, pressing the interactive interface elements of the video game controller virtual interface 835 can affect the virtual content 840 (the video game content), for example by controlling directions of flight of the rocketship (e.g., based on directions input to the D-pad) and by controlling firing of the laser gun (e.g., based on at least one of the four buttons). The user 505 is illustrated pressing one of the four buttons in the video game controller virtual interface 835, which may, for instance, be causing the XR device 520 to display the rocketship firing the laser gun in the virtual content 840 (the video game content).

The occlusions 810 are still visible in the FOV 860 to the user 505 as occlusions of the virtual interface 835. The XR device 520 can, in some examples, cut out portions of the virtual interface 835 at the positions of the occlusions 810 before overlaying the virtual interface 835 over the landmark patterns 830. The XR device 520 can, in some examples, overlay the virtual interface 835 over the landmark patterns 830, and then overlay image data corresponding to the occlusions 810 over the virtual interface 835.

The display interface device 510 is illustrated providing vibrational feedback 845 in FIG. 8B, with rounded lines at the corners of the display interface device 510 indicating that the display interface device 510 is vibrating. The vibrational feedback 845 may include haptic feedback, which may for example provide a small vibration when the user 505 touches a button, the D-pad, or another interactive interface element of the virtual interface 835. Haptic feedback can simulate the tactile feeling of a button press, and can provide the user with confirmation that the user 505 did in fact touch an interactive interface element. The vibrational feedback 845 may include force feedback or rumble feedback, which may for example vibrate the display interface device 510 in response to an action or condition that occurs in the virtual content 840 (in the video game). The action or condition can include, for example, the rocketship (the player character) firing the laser gun, the rocketship (the player character) being hit by a laser gun of a flying saucer (an enemy), the rocketship (the player character) colliding with a flying saucer (an enemy), the rocketship (the player character) exploding, a flying saucer (an enemy) being hit by a laser gun of the rocketship (the player character), a flying saucer (an enemy) exploding, or combinations thereof.

FIG. 9 is a conceptual diagram 900 illustrating a display interface device 510 switching between displaying a plurality of different landmark patterns 930A-930D over time 905, in accordance with some examples. The display interface device 510 is configured to shift between displaying each of the plurality of different landmark patterns 930A-930D over time 905. The display interface device 510 can be configured to shift between displaying each of the plurality of different landmark patterns 930A-930D over time 905 according to a predetermined timing and/or a predetermined frequency, for example changing from one of the landmark patterns 930A-930D periodically every time a certain duration of time (e.g., one or more seconds or milliseconds) passes from the previous landmark pattern change or periodically every time a certain number of frames (e.g., one or more frames) are captured by the image sensor(s) 220 of the XR device 520 from the previous landmark pattern change.

The first landmark pattern 930A illustrated in FIG. 9 is a first QR code. The second landmark pattern 930B illustrated in FIG. 9 is an Aztec code. The third landmark pattern 930C illustrated in FIG. 9 is a second QR code. The fourth landmark pattern 930D illustrated in FIG. 9 is a dot matrix code. An XR device 520 can determine, based on which of the different landmark patterns 930A-930D is displayed when a given touch input was received, an accurate timing of the touch input.

In some examples, each of the different landmark patterns 930A-930D may be a deterministic pattern dictated by a known number of rounds of a secure hash algorithm (SHA) (e.g., SHA-1, SHA-2, SHA-3, or SHA-N) changing at a known frequency. Both the XR device 520 and the display interface device 510 can have knowledge of the SHA seed and pattern sequence. When the display interface device 510 sends touch input identifier information to the XR device 520, the display interface device 510 can tag the touch input identifier information with the landmark pattern which was displayed when the touch input was detected and/or registered.

The XR device 520 can be responsible for rendering XR content (e.g., the virtual interface and/or virtual content). The XR device 520 can also observe the landmarks patterns changing dynamically in real time via the image sensors 220 of the XR device 520. Combined with the landmark-pattern-tagged touch input identifying information, the XR device 520 can know exactly what XR content (e.g., the virtual interface and/or virtual content) is displayed overlaid over the display interface device 510 when the touch input was registered. This synchronization can particularly important for dynamic touch interfaces. In an illustrative example, if the user 505 is dragging a (virtually-rendered) slider of the virtual interface, it is desirable for rendered slider position to match up precisely with position of the user 505's finger.

By detecting which landmark pattern of the set of different landmark patterns 930A-930D is depicted in the image, and lining that up with the time at which the touchscreen device displayed that landmark pattern, the XR device 202 and display interface device 510 can synchronize timings. The XR device 202 can obtain a more accurate indication of when a particular touch input was received at the display interface device 510 relative to what the XR device 202 is displaying as the virtual interface based on which landmark pattern the XR device 202 is overlaying the virtual interface over, increasing precision of the touch inputs for use by the XR device.

Figure 10:
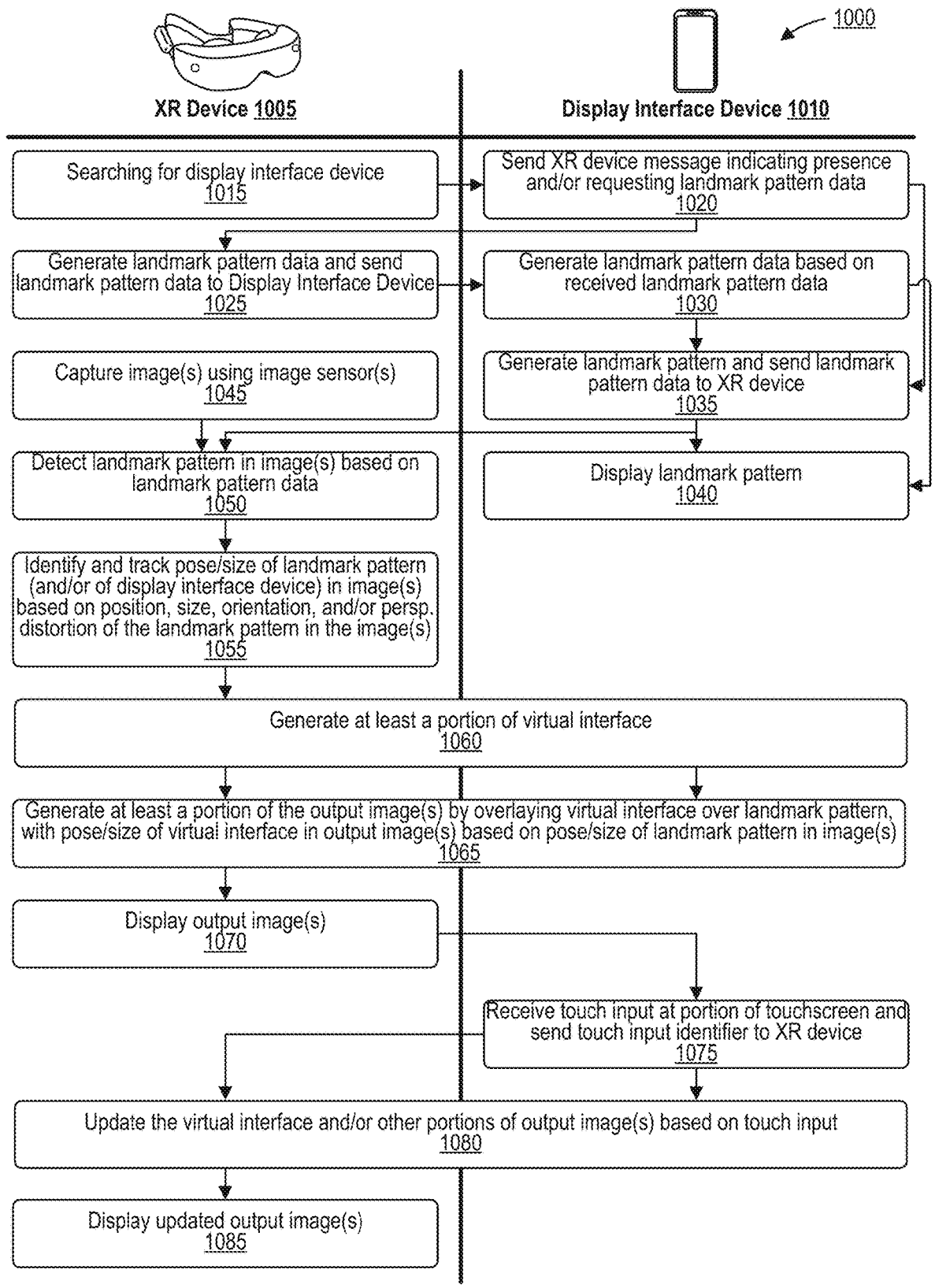
FIG. 10 is a swim lane diagram illustrating operations performed by an extended reality (XR) device and a display interface device for providing a virtual interface, in accordance with some examples.

FIG. 10 is a swim lane diagram illustrating operations 1000 performed by an extended reality (XR) device 1005 and a display interface device 1010 for providing a virtual interface, in accordance with some examples. The XR device 1005 may be an example of the XR device 202 of FIG. 2 and/or the XR device 520 of FIGS. 5A-5B, 6A-6B, 7A-7B, 8A-8B, and 9. The display interface device 1010 may be an example of the display interface device 250 of FIG. 2 and/or the display interface device 510 of FIGS. 5A-5B, 6A-6B, 7A-7B, 8A-8B, and 9.

At operation 1015, the XR device 1005 searches for the display interface device 1010, for example by searching for a depiction of the display interface device 1010 in image(s) captured by the image sensors 220 of FIG. 2 of the XR device 1005, by sending search signals and/or messages wirelessly within the range of the XR device 1005 (to the display interface device 1010 if it is in the range of the XR device 1005), and/or based on waiting to receive a wireless signal and/or message from the display interface device 1010 that indicates presence of the display interface device 1010 in the proximity (e.g., wireless signal range) of the XR device 1005. The display interface device 1010 may send such a signal and/or message to the XR device 1005 in some examples. The XR device 1005 can establish a line of communications with the display interface device 1010, or vice versa.

At operation 1020, the display interface device 1010 sends the XR device 1005 a message indicating the presence of the display interface device 1010 in the proximity of the XR device 1005, and/or requesting landmark pattern data from the XR device 1005. The display interface device 1010. Operation 1020 can be followed by operation 1025 and/or operation 1035.

At operation 1025, the XR device 1005 generates the landmark pattern data and sends the landmark pattern data to the display interface device 1010. Operation 1025 may correspond to blocks 226 and 274 of FIG. 2. At operation 1030, the display interface device 1010 receives the landmark pattern data from the XR device 1005 and generates further landmark pattern data based on the received landmark pattern data. The further landmark pattern data can be the received landmark pattern data, or can be generated based on (and different from) the received landmark pattern data. Operation 1020 can be followed by operation 1035 and/or operation 1040.

At operation 1035, the display interface device 1010 generates the landmark pattern, and in some cases can also send the landmark pattern data to the XR device 1005. At operation 1040, the display interface device 1010 displays the landmark pattern at operation 1040 on its display (e.g., display 260, as in block 262 of FIG. 2, and/or touchscreen display 515 of FIGS. 5A-9). The landmark pattern generated in operation 1035 can be based on the landmark pattern data sent from the XR device 1005 in operation 1025 and received by the display interface device 1010 in operation 1030. The landmark pattern generated in operation 1035 can be based on the further landmark pattern data generated by the display interface device 1010 in operation 1030. The landmark pattern can be generated by the display interface device 1010 based on landmark pattern data generated by the display interface device 1010 and not the XR device 1005, in which case the display interface device 1010 can send the landmark pattern data to the XR device 1005 to ensure the XR device 1005 has (or can generate) a reference copy of the landmark pattern. The landmark pattern data in operations 1025, 1030, 1035, 1040, 1050, and/or 1055 may be any of the types of landmark pattern data described with respect to blocks 226 and 274 of FIG. 2.

At operation 1045, the XR device 1005 captures one or more images using one or more image sensors 220 of the XR device 1005. At operation 1050, the XR device 1005 detects the landmark pattern in the image(s) captured by the one or more image sensors 220 of the XR device 1005 by comparing the captured image(s) to the reference landmark pattern data. At operation 1055, the XR device 1005 identifies and/or track a pose and/or size of the landmark pattern (and/or the display interface device 1010 the display of the display interface device 1010) in the image(s) based on position, size, orientation, and/or perspective distortion of landmark pattern in the image(s).

At operation 1060, the XR device 1005 and/or the display interface device 1010 generate at least a portion of the virtual interface. At operation 1065, the XR device 1005 and/or the display interface device 1010 generate at least a portion of the output image(s) by overlaying the virtual interface over the landmark pattern. The pose of virtual interface in output image(s) is based on the pose of the landmark pattern (and/or the display interface device 1010 the display of the display interface device 1010) in the image(s). The size of virtual interface in output image(s) is based on the size of the landmark pattern (and/or the display interface device 1010 the display of the display interface device 1010) in the image(s).

At operation 1070, the XR device 1005 displays the one or more output image(s) using one or more displays (e.g., the displays 234) of the XR device 1005. Operation 1070 can correspond to block 232 of FIG. 2.

At operation 1075, the display interface device 1010 receives a display interface input at a portion of display interface (e.g., display interface 261 as in block 264 of FIG. 2, and/or touchscreen display 515 as in FIGS. 5A-9), and sends a display interface input identifier (e.g., touch interface input identifier) corresponding to the display interface input (e.g., touch input) to XR device 1005 (e.g., as in blocks 272 and/or 228). At operation 1080, the XR device 1005 and/or the display interface device 1010 update the virtual interface and/or other portions of output image(s) (e.g., virtual content, displayed interfaces) based on the display interface input. At operation 1085, the XR device 1005 displays the one or more updated output image(s) using one or more displays (e.g., the displays 234) of the XR device 1005. Operation 1070 can correspond to block 232 of FIG. 2.

Figure 11:
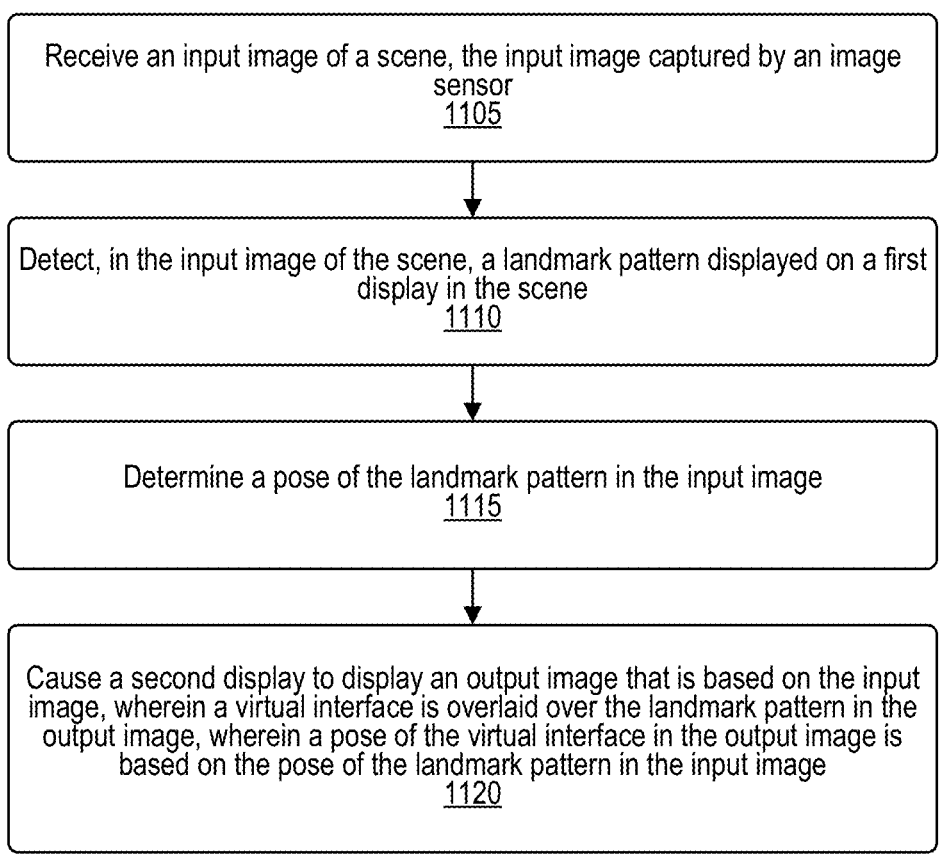
FIG. 11 is a flow diagram illustrating operations for processing image data, in accordance with some examples.

FIG. 11 is a flow diagram illustrating an example of a process 1100 for processing image data, in accordance with some examples. The process 1100 may be performed by an imaging system. In some examples, the imaging system can be the XR device 202 of FIG. 2. In some examples, the imaging system can include, for example, the image capture and processing system 100, the image capture device 105A, the image processing device 105B, the image processor 150, the ISP 154, the host processor 152 of FIG. 1, the XR system 200, the XR device 202, the display interface device 250 of FIG. 2, the HMD 310 of FIGS. 3A-3B, the mobile handset 410 of FIGS. 4A-4B, the XR device 520 of FIGS. 5A-9, the display interface device 510 of FIGS. 5A-9, the XR device 1005 of FIG. 10, the display interface device 1010 of FIG. 10, the computing system 1200, the processor 1210 of FIG. 12, or a combination thereof.

At operation 1105, the imaging system is configured to, and can, receive an input image of a scene. The input image is captured by an image sensor. Examples of the scene include the scene 110, a scene including at least a portion of the display 260 of the display interface device 250, the FOV 560, the FOV 660, the FOV 760, the FOV 860, a scene captured by the image(s) captured in operation 1045, or a combination thereof. Examples of the image sensor include the image sensor 130, the image sensor(s) 220, the sensors 276, image sensors of the cameras 330A-330B, image sensors of the cameras 430A-430D, one or more image sensors of the XR device 520, one or more image sensors of the XR device 1005 (e.g., as used in operation 1045), or a combination thereof. Examples of the input image include an image captured by the image sensors 220 in FIG. 2, an image captured by an image sensor of the XR device 520 in FIGS. 5A-5B (without the virtual interface 535 overlaid yet), an image captured by an image sensor of the XR device 520 in FIGS. 6A-6B (without the virtual interface 635 overlaid yet), an image captured by an image sensor of the XR device 520 in FIGS. 7A-7B (without the virtual interface 735 or virtual content 720 overlaid yet), an image captured by an image sensor of the XR device 520 in FIGS. 8A-8B (without the virtual interface 835 or virtual content 840 overlaid yet), the image(s) captured at operation 1045, or a combination thereof. In some examples, the imaging system may include a connector coupled to the image sensor, and the input image may be received using the connector. The connector may include a port, a jack, a wire, an input/output (IO) pin, a conductive trace on a printed circuit board (PCB), any other type of connector discussed herein, or some combination thereof. In some examples, the imaging system may include the image sensor that captures the input image. In some examples, the imaging system may include, to capture the input image, the image capture and processing system 100, the image capture device 105A, and/or the image processing device 105B. Operation 1105 can correspond to at least a subset of operations 1015, 1025, and/or 1045 by the XR device 1005.

At operation 1110, the imaging system is configured to, and can, detect, in the input image of the scene, a landmark pattern displayed on a first display in the scene. The landmark pattern can include at least one of a linear glyph, a linear barcode, a barcode a two-dimensional (2D) glyph, a 2D barcode, a Quick Response (QR) code, a micro QR code, a barcode, a MaxiCode, an Aztec code, a PDF417 code, an ArUco code, a data matrix, a grid matrix, a code one code, a stacked barcode, a shotcode, a JAB code, a high capacity color barcode (HCCB), a checkerboard pattern, a three-dimensional (3D) glyph, a 3D barcode, one or more colors, or a combination thereof. Examples of the landmark pattern include a landmark pattern generated by (and/or for which landmark pattern data is generated by) the landmark pattern generator 214, a landmark pattern generated by (and/or for which landmark pattern data is generated by) the landmark pattern generator 258, a landmark pattern displayed on the display 260 as part of displaying the content 262, the landmark pattern 530, the landmark patterns 630, the landmark pattern 730, the landmark patterns 830, the landmark patterns 930A-930D, the landmark pattern generated at operations 1025-1035, the landmark pattern displayed at operation 1040, or a combination thereof. In some examples, the imaging system includes a reference copy of the landmark pattern, and detects the landmark pattern in the input image by searching for features matching those of the reference copy of the landmark pattern in the input image. Operation 1110 can correspond to operation 1050 by the XR device 1005.

At operation 1115, the imaging system is configured to, and can, determine a pose of the landmark pattern (and/or of the first display) in the input image. The pose of the landmark pattern can include the position (e.g., two-dimensional coordinates in the image and/or three-dimensional coordinates in the environment) of the landmark pattern, the orientation (e.g., pitch, yaw, and/or roll) of the landmark pattern, or a combination thereof. In some aspects, the imaging system is configured to, and can, determine a size of the landmark pattern (and/or of the first display) in the input image. Size can include three-dimensional volume, two-dimensional area, and/or one-dimensional measurement (e.g., height, width). Size can include absolute size and/or relative size (relative to something else in the image data). Size of the landmark patterns can be identified as an absolute size or as a size relative to another size in the input image (e.g., the size of the first display, of a display device that displays the landmark pattern on the first display, of a person). Size of the first display can be identified as an absolute size or as a size relative to another size in the input image (e.g., the size of the landmark pattern, of a display device that displays the landmark pattern on the first display, of a person). In some examples, the imaging system determines the pose of the landmark pattern (and/or of the first display) in the input image by comparing the depiction of the landmark pattern in the input image to a reference copy (with no perspective distortion) of the landmark pattern in the input image, and determining the pose at least in part by determining the perspective distortion of the depiction of the landmark pattern in the input image based on the comparison to the reference copy. In some examples, the imaging system determines the pose and/or size of the first display and/or of a display device that includes the first display at least in part by receiving information from the display device indicating the pose and/or size of the first display and/or of the display device. Operation 1115 can correspond to operation 1055 by the XR device 1005.

At operation 1120, the imaging system is configured to, and can, cause a second display to display an output image that is based on the input image. A virtual interface is overlaid over the landmark pattern in the output image. A pose of the virtual interface in the output image is based on the pose of the landmark pattern (and/or of the first display) in the input image. The imaging system can generate and/or modify the virtual interface and/or the output image to be in the pose of the virtual interface based on the pose of the landmark pattern (and/or of the first display) in the input image. In some aspects, a size of the virtual interface in the output image is based on the size of the landmark pattern and/or the size of the first display in the input image. The imaging system can generate and/or modify the virtual interface and/or the output image to have the size of the virtual interface based on the size of the landmark pattern (and/or of the first display) in the input image. The imaging system can include the second display.

Examples of the virtual interface include the virtual interface generated at least in part by the virtual interface generator 206, the virtual interface 535, the virtual interface 635, the virtual interface 735, the virtual interface 835, the virtual interface generated in operation 1060, the virtual interface overlaid over the landmark pattern in operation 1065, the virtual interface updated in operation 1080, or a combination thereof. Examples of the output image include the output image generated at least in part using the output image compositor 212, the output image(s) displayed by displaying the output image(s) 232 on the display(s) 234, an output image depicting the FOV 560 and including the virtual interface 535 and displayed to the user 505 of the XR device 520 via one or more displays of the XR device 520, an output image depicting the FOV 660 and including the virtual interface 635 and the occlusion 610 and the occlusion 620 and displayed to the user 505 of the XR device 520 via one or more displays of the XR device 520, an output image depicting the FOV 760 and including the virtual interface 735 and the virtual content 720 and the displayed interface 710 and displayed to the user 505 of the XR device 520 via one or more displays of the XR device 520, an output image depicting the FOV 860 and including the virtual interface 835 and the occlusions 810 and the virtual content 840 and displayed to the user 505 of the XR device 520 via one or more displays of the XR device 520, the output image(s) generated in operation 1065, the output image(s) displayed at operation 1070, the output image(s) updated in operation 1080, the output image(s) displayed at operation 1085, or a combination thereof. Operation 1120 can correspond to at least a subset of operations 1060 to 1085 by the XR device 1005.

In some aspects, the imaging system is configured to, and can, identify that an object occludes a region of the first display that includes at least a portion of the landmark pattern in the input image. Causing the second display to display the output image as in operation 1120 can include the imaging system occluding a portion of the virtual interface that corresponds to the region of the first display in the output image. Examples of the object include the occlusion 610 (e.g., the hand), the occlusion 620 (e.g., the finger), and the occlusions 810 (e.g., the fingers). Examples of the imaging system occluding the portion of the virtual interface that corresponds to the region of the first display in the output image are illustrated at least in FIGS. 6B and 8B. For instance, in FIG. 6B, the occlusions 610 and 620 occlude portions of the virtual interface 635 corresponding to the regions of the touchscreen display 515 occluded by the occlusions 610 and 620 in FIG. 6A. In FIG. 8B, the occlusions 810 occlude portions of the virtual interface 835 corresponding to the regions of the touchscreen display 515 occluded by the occlusions 810 in FIG. 8A.

In some aspects, the imaging system is configured to, and can, generate at least a portion of the virtual interface. In some aspects, the imaging system is configured to, and can, receive at least a portion of the virtual interface from a display device that includes the first display. Examples of the display device can include the display interface device 250, the HMD 310, the mobile handset 410, the display interface device 520, the display interface device 1010, or a combination thereof. For example, in FIG. 10, the generation of the virtual interface at operation 1060 can be performed by the XR device 1005, the display interface device 1010, or a combination thereof.

In some aspects, the imaging system is configured to, and can: generate at least a portion of the output image. In some aspects, generating at least the portion of the output image includes modifying the virtual interface using a perspective distortion that is based on the pose of the landmark pattern (and/or of the first display) in the input image. For instance, the imaging system can perform display interface device tracking 224 to track the pose of the landmark pattern (and/or of the first display) in the input image. In some examples, the imaging system can determine the pose of the first display based on the pose of the landmark pattern. The imaging system can include the virtual interface generator 206 and the output image compositor 212, which may perform the perspective distortion of the virtual interface in the output image 232 based on the pose of the landmark pattern (and/or of the first display) in the input image. An example of the perspective distortion is illustrated in FIGS. 5A-5B, where the virtual interface 535 is rotated clockwise slightly based on the pose of the landmark pattern 530 and/or of the touchscreen display 515 and/or of the display interface device 510 from the FOV 560 of the XR device 520. The virtual interface generator 206 and the output image compositor 212 may perform resizing of the virtual interface in the output image 232 based on the size of the landmark pattern (and/or of the first display) in the input image.

In some aspects, the imaging system is configured to, and can: generate landmark pattern data corresponding to the landmark pattern, and send the landmark pattern data to a display device that includes the first display for the display device to display the landmark pattern on the first display in response to receiving the landmark pattern data. Examples of the display device can include the display interface device 250, the HMD 310, the mobile handset 410, the display interface device 520, the display interface device 1010, or a combination thereof. The landmark pattern data can include the landmark pattern. The landmark pattern data can include data that characterizes the landmark pattern and/or can be used to recreate a reference copy of the landmark pattern (e.g., data encoded by a QR code or barcode or other coding scheme of the landmark pattern). The landmark pattern data can be generated by the landmark pattern generator 214, and can be sent (block 226) via wireless transceiver(s) 230 to the display device (display interface device 250).

In some aspects, the imaging system is configured to, and can: receive, from a display device that includes the first display, a display interface input identifier indicative of a portion of the first display receiving a display interface input via a display interface of the display device, the display interface associated with the first display. Examples of the display device can include the display interface device 250, the HMD 310, the mobile handset 410, the display interface device 520, the display interface device 1010, or a combination thereof. Examples of the display interface corresponding to the first display include the display interface 261 corresponding to the display 260. Examples of receipt of the display interface inputs is illustrated at block 264 of FIG. 2.

The first display can be a display layer of a touchscreen display of the display device. The display interface can be a touch-sensitive layer of the touchscreen display. The display interface input can be a touch input detected by the touch-sensitive layer of the touchscreen display. Examples of the touchscreen display include the touchscreen display 515 of the display interface device 510. The touch input can include, for example, touches, taps, double taps, triple taps, swipes, long presses, gestures, multi-finger variants of any of the previously listed touch inputs, or combinations thereof.

The display interface can control a cursor on the first display. The display interface input can be a cursor input based on a position of the cursor on the first display. The display interface can include at least one of a mouse, a trackpad, a touch-sensitive surface, a touchscreen, a joystick, a keypad, a keyboard, a button, a controller, a remote control, or a combination thereof. The cursor input can include, for example, clicks, double-clicks, triple-clicks, click-and-drag operations, circling with the cursor, pointing at with the cursor, hovering over with the cursor, gesturing around or over with the cursor, or a combination thereof.

The display interface can perform hand tracking of a hand in relation to the first display. The display interface input can indicate a position on the first display corresponding to a position of the hand. The display interface can include one or more cameras and/or one or more range sensors. The display interface can use the one or more cameras and/or one or more range sensors to perform the hand tracking. The display interface input can be associated with at least one of the hand touching the position on the first display, the hand hovering over the position on the first display, the hand pointing at the position on the first display, the hand gesturing with respect to the position on the first display, a finger of the hand touching the position on the first display, the finger of the hand hovering over the position on the first display, the finger of the hand pointing at the position on the first display, the finger of the hand gesturing with respect to the position on the first display, or a combination thereof. The imaging system can include at least a subset of the one or more cameras and/or one or more range sensors. The display device that includes the first display can include at least a subset of the one or more cameras and/or one or more range sensors. The one or more range sensors can include, for example, a RADAR sensor, a LIDAR sensor, a SONAR sensor, a SODAR sensor, a time of flight sensor, a structured light sensor, or a combination thereof.

In some aspects, the imaging system is configured to, and can: identify that the portion of the first display indicated by the display interface input identifier aligns with a portion of the virtual interface in the output image. For instance, the imaging system can identify that the display interface input identifier indicates a display interface input at a particular set of coordinates on the first display, the set of coordinates on the first display also aligning with a virtual interface element (e.g., one or more buttons, sliders, scrollbars, radio buttons, checkboxes, knobs, wheels, text fields, touch-based keypads, touch-based keyboards, touch-based drawing areas, or combinations thereof) of the virtual interface. For example, in FIG. 8B, the display interface input identifier may be a touch input identifier indicating that the thumb of the user 505's right hand has touched a set of coordinates on the touchscreen display 515, and the imaging system may identify that that set of coordinates on the touchscreen display 515 corresponds to one of the controller buttons of the virtual interface 835.

The imaging system can modify the virtual interface automatically in response to identifying that the portion of the first display indicated by the display interface input identifier aligns with the portion of the virtual interface in the output image. For instance, if the virtual interface is the music player virtual interface 535 of FIG. 5B, then pressing the "skip" button on the virtual interface 535 via a touch input to the touchscreen 515 or the may skip to a next song and therefore trigger modification of the virtual interface to identify the next song. Similarly, if the virtual interface is the music player virtual interface 535 of FIG. 5B, then sliding the slider of the virtual interface 535 via a touch input to the touchscreen 515 may trigger modification of the virtual interface to move the slider. If the virtual interface is the video player virtual interface 735 of FIG. 7B, then sliding the slider of the virtual interface 735 or pressing any button (e.g., play, fast forward, rewind, pause) of the virtual interface 735 via a touch input to the touchscreen 515 may trigger modification of the virtual interface to move the slider and/or update the video being played by the video player virtual interface 735 with the appropriate video frame. If the virtual interface is the image viewer virtual interface 635 of FIG. 6B, then swiping down the image viewer virtual interface 635 can scroll through the images and thus may trigger modification of the virtual interface to scroll through the images. If the virtual interface is the image viewer virtual interface 635 of FIG. 6B, then touching an image in the image viewer virtual interface 635 can zoom in on or center in on the selected image and thus may trigger modification of the virtual interface to zoom in on or center in on the selected image.

The imaging system can output an audio clip automatically in response to identifying that the portion of the first display identified by the display interface input identifier aligns with the portion of the virtual interface in the output image. For instance, if the virtual interface is the music player virtual interface 535 of FIG. 5B, then pressing the "play" button on the virtual interface 535 via a touch input to the touchscreen 515 may play a song, with the song being an example of the audio clip. If the virtual interface is the video player virtual interface 735 of FIG. 5B, then pressing the "play" button on the virtual interface 535 via a touch input to the touchscreen 515 may play a song, with the song being an example of the audio clip. If the virtual interface is the video player virtual interface 735 of FIG. 7B, then sliding the slider of the virtual interface 735 or pressing any button (e.g., play, fast forward, rewind, pause) of the virtual interface 735 via a touch input to the touchscreen 515 may trigger playing the audio track of the video being played by the video player virtual interface 735 corresponding to the appropriate video frame, the audio track of the video being an example of the audio clip. If the virtual interface is the game controller virtual interface 835 of FIG. 8B, then pressing the various game buttons on the virtual interface 835 via a touch input can perform an action in the game (e.g., fire a weapon) and can play a sound effect in the game, with the sound effect being an example of the audio clip.

The imaging system can output a vibration automatically in response to identifying that the portion of the first display identified by the display interface input identifier aligns with the portion of the virtual interface in the output image. Examples of the vibration include the vibrational feedback 845. For example, if the virtual interface is the game controller virtual interface 835 of FIG. 8B, then pressing the various game buttons on the virtual interface 835 via a touch input can perform an action in the game (e.g., fire a weapon) and can provide vibrational feedback 845.

The imaging system can receive a second input image of the scene. The second input image can be captured by the image sensor after capture of the input image. The imaging system can cause the second display to display a second output image. The second output image includes virtual content overlaid over the second input image. The virtual content is automatically set (e.g., selected, posed within the scene, sized within the scene) by the imaging system based on identifying that the portion of the first display indicated by the display interface input identifier aligns with the portion of the virtual interface in the output image. Examples of the virtual content include virtual content generated by the virtual content generator 210, virtual content composited into the second output image using the output image compositor 212, the virtual content 720, the virtual content 840, or a combination thereof. Examples of the second output image include the output image generated at least in part using the output image compositor 212, the output image(s) displayed by displaying the output image(s) 232 on the display(s) 234, an output image depicting the FOV 760 and including the virtual interface 735 and the virtual content 720 and the displayed interface 710 and displayed to the user 505 of the XR device 520 via one or more displays of the XR device 520, an output image depicting the FOV 860 and including the virtual interface 835 and the occlusions 810 and the virtual content 840 and displayed to the user 505 of the XR device 520 via one or more displays of the XR device 520, the output image(s) generated in operation 1065, the output image(s) displayed at operation 1070, the output image(s) updated in operation 1080, the output image(s) displayed at operation 1085, or a combination thereof.

In some aspects, the imaging system can include: means for receiving an input image of a scene, the input image captured by an image sensor; means for detecting, in the input image of the scene, a landmark pattern displayed on a first display in the scene; means for determining a pose of the landmark pattern in the input image; and means for causing a second display to display an output image that is based on the input image, wherein a virtual interface is overlaid over the landmark pattern in the output image, wherein a pose of the virtual interface in the output image is based on the pose of the landmark pattern in the input image. In some examples, the means for receiving the input image include the image sensor 130, the image capture device 105A, the image processing device 105B, the image capture and processing device 100, the XR device 202, the image sensors 220, the XR application 204, the cameras 330A-330B, the cameras 430A-430D, one or more image sensors of the XR device 520, one or more image sensors of the XR device 1005 (e.g., as used in operation 1045), or a combination thereof. In some examples, the means for detecting the landmark pattern include the image processing device 105B, the image capture and processing device 100, the image processor 150, the host processor 152, the image sensors 220, the display interface device tracking 224, a display interface device tracking engine of the XR device 202 that performs the display interface device tracking 224, the XR application 204, or a combination thereof. In some examples, the means for determining the pose of the landmark pattern include the image processing device 105B, the image capture and processing device 100, the image processor 150, the host processor 152, the image sensors 220, the display interface device tracking 224, a display interface device tracking engine of the XR device 202 that performs the display interface device tracking 224, the XR application 204, or a combination thereof. In some examples, the means for causing the second display to display the output image include the virtual interface generator 208, the occlusion detector 208, the virtual content generator 210, the output image compositor 212, the displaying of the output content 232, the display(s) 234, the XR application 204, display controller(s) for the display(s) 234, or a combination thereof.

In some examples, the processes described herein (e.g., process 1100 and/or other process described herein) may be performed by a computing device or apparatus. In some examples, the process 1100 can be performed by the XR system 200 of FIG. 2. In some examples, the process 1100 can be performed by the XR device 202 of FIG. 2, the XR device 520 of FIGS. 5A-9, the XR device 1005 of FIG. 10, or a combination thereof. In another example, the process 1100 can be performed by a computing device with the computing system 1200 shown in FIG. 12.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1100. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 1000 and 1100 are illustrated as logical flow diagrams, the operations of which represent a sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1000, 1100, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
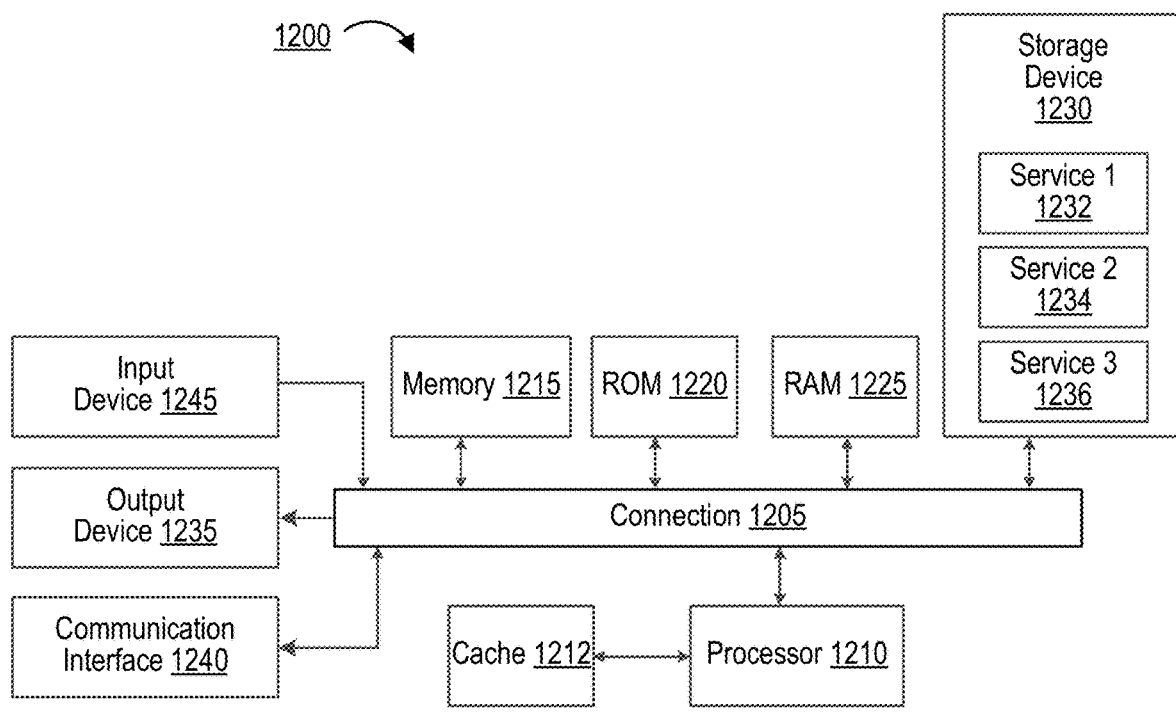
FIG. 12 is a diagram illustrating an example of a computing system for implementing certain aspects described herein.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection. Examples of the computing system 1200 may include, for example, the image capture and processing system 100, the image capture device 105A, the image processing device 105B, the image processor 150, the ISP 154, the host processor 152 of FIG. 1, the XR system 200, the XR device 202, the display interface device 250 of FIG. 2, the HMD 310 of FIGS. 3A-3B, the mobile handset 410 of FIGS. 4A-4B, the XR device 520 of FIGS. 5A-9, the display interface device 510 of FIGS. 5A-9, the XR device 1005 of FIG. 10, the display interface device 1010 of FIG. 10, the imaging system that performs the operations 1100, the computing system 1200, the processor 1210 of FIG. 12, or a combination thereof.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for processing image data, the apparatus comprising: a memory; and one or more processors coupled to the memory, the one or more processors configured to: receive an input image of a scene, the input image captured by an image sensor; detect, in the input image of the scene, a landmark pattern displayed on a first display in the scene; determine a pose of the landmark pattern in the input image; and cause a second display to display an output image that is based on the input image, wherein a virtual interface is overlaid over the landmark pattern in the output image, wherein a pose of the virtual interface in the output image is based on the pose of the landmark pattern in the input image.

Aspect 2. The apparatus of Aspect 1, wherein the landmark pattern includes at least one of a linear glyph, a linear barcode, a barcode a two-dimensional (2D) glyph, a 2D barcode, a Quick Response (QR) code, a micro QR code, a barcode, a MaxiCode, an Aztec code, a PDF417 code, an ArUco code, a data matrix, a grid matrix, a code one code, a stacked barcode, a shotcode, a JAB code, a high capacity color barcode (HCCB), a checkerboard pattern, a three-dimensional (3D) glyph, a 3D barcode, and one or more colors.

Aspect 3. The apparatus of any of Aspects 1 to 2, wherein the one or more processors are configured to: identify that an object occludes a region of the first display that includes at least a portion of the landmark pattern in the input image, and wherein, to cause the second display to display the output image, the one or more processors are configured to occlude a portion of the virtual interface that corresponds to the region of the first display in the output image.

Aspect 4. The apparatus of any of Aspects 1 to 3, wherein the one or more processors are configured to: generate at least a portion of the virtual interface.

Aspect 5. The apparatus of any of Aspects 1 to 4, wherein the one or more processors are configured to: receive at least a portion of the virtual interface from a display device that includes the first display.

Aspect 6. The apparatus of any of Aspects 1 to 5, wherein the one or more processors are configured to: generate at least a portion of the output image.

Aspect 7. The apparatus of Aspect 6, wherein, to generate at least the portion of the output image, the one or more processors are configured to modify the virtual interface using a perspective distortion that is based on the pose of the landmark pattern in the input image.

Aspect 8. The apparatus of any of Aspects 1 to 7, wherein the one or more processors are configured to: generate landmark pattern data corresponding to the landmark pattern; and send the landmark pattern data to a display device that includes the first display for the display device to display the landmark pattern on the first display in response to receiving the landmark pattern data.

Aspect 9. The apparatus of any of Aspects 1 to 8, wherein the one or more processors are configured to: receive, from a display device that includes the first display, a display interface input identifier indicative of a portion of the first display receiving a display interface input via a display interface of the display device, the display interface associated with the first display.

Aspect 10. The apparatus of Aspect 9, wherein the first display is a display layer of a touchscreen display of the display device, wherein the display interface is a touch-sensitive layer of the touchscreen display, wherein the display interface input is a touch input detected by the touch-sensitive layer of the touchscreen display.

Aspect 11. The apparatus of any of Aspects 9 to 10, wherein the display interface controls a cursor on the first display, wherein the display interface input is a cursor input based on a position of the cursor on the first display, wherein the display interface includes at least one of a mouse, a trackpad, a touch-sensitive surface, a touchscreen, a joystick, a keypad, a keyboard, a button, a controller, and a remote control.

Aspect 12. The apparatus of any of Aspects 9 to 11, wherein the display interface performs hand tracking of a hand in relation to the first display, wherein the display interface input indicates a position on the first display corresponding to a position of the hand, wherein the display interface includes at least one of a camera and a range sensor, wherein the display interface input is associated with at least one of the hand touching the position on the first display, the hand hovering over the position on the first display, the hand pointing at the position on the first display, and the hand gesturing with respect to the position on the first display.

Aspect 13. The apparatus of any of Aspects 9 to 12, wherein the one or more processors are configured to: identify that the portion of the first display indicated by the display interface input identifier aligns with a portion of the virtual interface in the output image.

Aspect 14. The apparatus of Aspect 13, wherein the one or more processors are configured to: modify the virtual interface automatically in response to identifying that the portion of the first display indicated by the display interface input identifier aligns with the portion of the virtual interface in the output image.

Aspect 15. The apparatus of any of Aspects 13 to 14, wherein the one or more processors are configured to: receive a second input image of the scene, the second input image captured by the image sensor after capture of the input image; and cause the second display to display a second output image, wherein the second output image includes virtual content overlaid over the second input image, wherein the virtual content is automatically set based on identifying that the portion of the first display indicated by the display interface input identifier aligns with the portion of the virtual interface in the output image.

Aspect 16. The apparatus of any of Aspects 13 to 15, wherein the one or more processors are configured to: output an audio clip automatically in response to identifying that the portion of the first display identified by the display interface input identifier aligns with the portion of the virtual interface in the output image.

Aspect 17. The apparatus of any of Aspects 13 to 16, wherein the one or more processors are configured to: output a vibration automatically in response to identifying that the portion of the first display identified by the display interface input identifier aligns with the portion of the virtual interface in the output image.

Aspect 18. The apparatus of any of Aspects 1 to 17, wherein the one or more processors are configured to: determine a size of the first display in the input image, wherein a size of the virtual interface in the output image is based on the size of the first display in the input image.

Aspect 19. The apparatus of any of Aspects 1 to 18, wherein the one or more processors are configured to: determine a size of the landmark pattern in the input image, wherein a size of the virtual interface in the output image is based on the size of the landmark pattern in the input image.

Aspect 20. The apparatus of any of Aspects 1 to 19, further comprising: the image sensor.

Aspect 21. The apparatus of any of Aspects 1 to 20, further comprising: the second display.

Aspect 22. The apparatus of any of Aspects 1 to 21, wherein the apparatus includes at least one of a mobile handset, a wireless communication device, and a head-mounted display (HMD).

Aspect 23. A method for processing image data, the method comprising: receiving an input image of a scene, the input image captured by an image sensor; detecting, in the input image of the scene, a landmark pattern displayed on a first display in the scene; determining a pose of the landmark pattern in the input image; and causing a second display to display an output image that is based on the input image, wherein a virtual interface is overlaid over the landmark pattern in the output image, wherein a pose of the virtual interface in the output image is based on the pose of the landmark pattern in the input image.

Aspect 24. The method of Aspect 23, wherein the landmark pattern includes at least one of a linear glyph, a linear barcode, a barcode a two-dimensional (2D) glyph, a 2D barcode, a Quick Response (QR) code, a micro QR code, a barcode, a MaxiCode, an Aztec code, a PDF417 code, an ArUco code, a data matrix, a grid matrix, a code one code, a stacked barcode, a shotcode, a JAB code, a high capacity color barcode (HCCB), a checkerboard pattern, a three-dimensional (3D) glyph, a 3D barcode, and one or more colors.

Aspect 25. The method of any of Aspects 23 to 24, further comprising: identifying that an object occludes a region of the first display that includes at least a portion of the landmark pattern in the input image, and wherein to causing the second display to display the output image includes occluding a portion of the virtual interface that corresponds to the region of the first display in the output image.

Aspect 26. The method of any of Aspects 23 to 25, further comprising: generating at least a portion of the virtual interface.

Aspect 27. The method of any of Aspects 23 to 26, further comprising: receiving at least a portion of the virtual interface from a display device that includes the first display.

Aspect 28. The method of any of Aspects 23 to 27, further comprising: generating at least a portion of the output image.

Aspect 29. The method of Aspect 28, wherein generating at least the portion of the output image includes modifying the virtual interface using a perspective distortion that is based on the pose of the landmark pattern in the input image.

Aspect 30. The method of any of Aspects 23 to 29, further comprising: generating landmark pattern data corresponding to the landmark pattern; and sending the landmark pattern data to a display device that includes the first display for the display device to display the landmark pattern on the first display in response to receiving the landmark pattern data.

Aspect 31. The method of any of Aspects 23 to 30, further comprising: receiving, from a display device that includes the first display, a display interface input identifier indicative of a portion of the first display receiving a display interface input via a display interface of the display device, the display interface associated with the first display.

Aspect 32. The method of any Aspect 31, wherein the first display is a display layer of a touchscreen display of the display device, wherein the display interface is a touch-sensitive layer of the touchscreen display, wherein the display interface input is a touch input detected by the touch-sensitive layer of the touchscreen display.

Aspect 33. The method of any of Aspects 31 to 32, wherein the display interface controls a cursor on the first display, wherein the display interface input is a cursor input based on a position of the cursor on the first display, wherein the display interface includes at least one of a mouse, a trackpad, a touch-sensitive surface, a touchscreen, a joystick, a keypad, a keyboard, a button, a controller, and a remote control.

Aspect 34. The method of any of Aspects 31 to 33, wherein the display interface performs hand tracking of a hand in relation to the first display, wherein the display interface input indicates a position on the first display corresponding to a position of the hand, wherein the display interface includes at least one of a camera and a range sensor, wherein the display interface input is associated with at least one of the hand touching the position on the first display, the hand hovering over the position on the first display, the hand pointing at the position on the first display, and the hand gesturing with respect to the position on the first display.

Aspect 35. The method of any of Aspects 31 to 34, further comprising: identifying that the portion of the first display indicated by the display interface input identifier aligns with a portion of the virtual interface in the output image.

Aspect 36. The method of any of Aspect 35, further comprising: modifying the virtual interface automatically in response to identifying that the portion of the first display indicated by the display interface input identifier aligns with the portion of the virtual interface in the output image.

Aspect 37. The method of any of Aspects 35 to 36, further comprising: receiving a second input image of the scene, the second input image captured by the image sensor after capture of the input image; and causing the second display to display a second output image, wherein the second output image includes virtual content overlaid over the second input image, wherein the virtual content is automatically set based on identifying that the portion of the first display indicated by the display interface input identifier aligns with the portion of the virtual interface in the output image.

Aspect 38. The method of any of Aspects 35 to 37, further comprising: outputting an audio clip automatically in response to identifying that the portion of the first display identified by the display interface input identifier aligns with the portion of the virtual interface in the output image.

Aspect 39. The method of any of Aspects 35 to 38, further comprising: outputting a vibration automatically in response to identifying that the portion of the first display identified by the display interface input identifier aligns with the portion of the virtual interface in the output image.

Aspect 40. The method of any of Aspects 23 to 39, further comprising: determining a size of the first display in the input image, wherein a size of the virtual interface in the output image is based on the size of the first display in the input image.

Aspect 41. The method of any of Aspects 23 to 40, further comprising: determining a size of the landmark pattern in the input image, wherein a size of the virtual interface in the output image is based on the size of the landmark pattern in the input image.

Aspect 42. The method of any of Aspects 23 to 41, wherein the method is performed by an apparatus that includes the image sensor.

Aspect 43. The method of any of Aspects 23 to 42, wherein the method is performed by an apparatus that includes the second display.

Aspect 44. The method of any of Aspects 23 to 43, wherein the method is performed by an apparatus that includes at least one of a mobile handset, a wireless communication device, and a head-mounted display (HMD).

Aspect 45: A non-transitory computer-readable medium having stored thereon instructions that, when executed by one or more processors, cause the one or more processors to: receive an input image of a scene, the input image captured by an image sensor; detect, in the input image of the scene, a landmark pattern displayed on a first display in the scene; determine a pose of the landmark pattern in the input image; and cause a second display to display an output image that is based on the input image, wherein a virtual interface is overlaid over the landmark pattern in the output image, wherein a pose of the virtual interface in the output image is based on the pose of the landmark pattern in the input image.

Aspect 46: The non-transitory computer-readable medium of Aspect 45, further comprising any of Aspects 2 to 22, and/or any of Aspects 24 to 44.

Aspect 47: An apparatus for image processing, the apparatus comprising: means for receiving an input image of a scene, the input image captured by an image sensor; means for detecting, in the input image of the scene, a landmark pattern displayed on a first display in the scene; means for determining a pose of the landmark pattern in the input image; and means for causing a second display to display an output image that is based on the input image, wherein a virtual interface is overlaid over the landmark pattern in the output image, wherein a pose of the virtual interface in the output image is based on the pose of the landmark pattern in the input image.

Aspect 48: The apparatus of Aspect 47, further comprising any of Aspects 2 to 22, and/or any of Aspects 24 to 44.

What is claimed is:

1. An apparatus for processing image data, the apparatus comprising:
   a memory; and
   one or more processors coupled to the memory, the one or more processors configured to:
      receive an input image of a scene, the input image captured by an image sensor;
      detect, in the input image of the scene, a landmark pattern displayed on a first display in the scene, the landmark pattern including spatial variations, wherein a subset of the spatial variations of the landmark pattern are occluded by an occlusion;
      determine a pose of the landmark pattern in the input image; and
      cause a second display to display an output image that is based on the input image, wherein a virtual interface is overlaid over the landmark pattern in the output image, wherein a pose of the virtual interface in the output image is based on the pose of the landmark pattern in the input image, wherein a portion of the virtual interface is occluded in the output image, the portion of the virtual interface selected based on the subset of the spatial variations of the landmark pattern that is occluded by the occlusion in the input image.

2. The apparatus of claim 1, wherein the landmark pattern includes a Quick Response (QR) code.

3. The apparatus of claim 1, wherein the one or more processors are configured to:
   identify that the subset of the spatial variations of the landmark pattern are occluded by the occlusion based on a comparison between the landmark pattern as depicted in the input image and a reference instance of the landmark pattern.

4. The apparatus of claim 1, wherein the one or more processors are configured to:
   generate at least a portion of the virtual interface.

5. The apparatus of claim 1, wherein the one or more processors are configured to:
   receive at least a portion of the virtual interface from a display device that includes the first display.

6. The apparatus of claim 1, wherein the one or more processors are configured to:
   generate at least a portion of the output image.

7. The apparatus of claim 6, wherein, to generate at least the portion of the output image, the one or more processors are configured to modify the virtual interface using a perspective distortion that is based on the pose of the landmark pattern in the input image.

8. The apparatus of claim 1, wherein the one or more processors are configured to:
   generate landmark pattern data corresponding to the landmark pattern; and
   send the landmark pattern data to a display device that includes the first display for the display device to display the landmark pattern on the first display in response to receiving the landmark pattern data.

9. The apparatus of claim 1, wherein the one or more processors are configured to:
   receive, from a display device that includes the first display, a display interface input identifier indicative of a portion of the first display receiving a display interface input via a display interface of the display device, the display interface associated with the first display.

10. The apparatus of claim 9, wherein the first display is a display layer of a touchscreen display of the display device, wherein the display interface is a touch-sensitive layer of the touchscreen display, wherein the display interface input is a touch input detected by the touch-sensitive layer of the touchscreen display.

11. The apparatus of claim 9, wherein the one or more processors are configured to:
   identify that the portion of the first display indicated by the display interface input identifier aligns with a portion of the virtual interface in the output image.

12. The apparatus of claim 11, wherein the one or more processors are configured to:
   modify the virtual interface automatically in response to identifying that the portion of the first display indicated by the display interface input identifier aligns with the portion of the virtual interface in the output image.

13. The apparatus of claim 11, wherein the one or more processors are configured to:
   receive a second input image of the scene, the second input image captured by the image sensor after capture of the input image; and
   cause the second display to display a second output image, wherein the second output image includes virtual content overlaid over the second input image, wherein the virtual content is automatically set based on identifying that the portion of the first display indicated by the display interface input identifier aligns with the portion of the virtual interface in the output image.

14. The apparatus of claim 11, wherein the one or more processors are configured to:
output an audio clip automatically in response to identifying that the portion of the first display identified by the display interface input identifier aligns with the portion of the virtual interface in the output image.

15. The apparatus of claim 1, wherein the one or more processors are configured to:
determine a size of the first display in the input image, wherein a size of the virtual interface in the output image is based on the size of the first display in the input image.

16. The apparatus of claim 1, wherein the one or more processors are configured to:
determine a size of the landmark pattern in the input image, wherein a size of the virtual interface in the output image is based on the size of the landmark pattern in the input image.

17. The apparatus of claim 1, further comprising:
the image sensor.

18. The apparatus of claim 1, further comprising:
the second display.

19. The apparatus of claim 1, wherein the apparatus includes at least one of a mobile handset, a wireless communication device, and a head-mounted display (HMD).

20. A method for processing image data, the method comprising:
receiving an input image of a scene, the input image captured by an image sensor;
detecting, in the input image of the scene, a landmark pattern displayed on a first display in the scene, the landmark pattern including spatial variations, wherein a subset of the spatial variations of the landmark pattern are occluded by an occlusion;
determining a pose of the landmark pattern in the input image; and
causing a second display to display an output image that is based on the input image, wherein a virtual interface is overlaid over the landmark pattern in the output image, wherein a pose of the virtual interface in the output image is based on the pose of the landmark pattern in the input image, wherein a portion of the virtual interface is occluded in the output image, the portion of the virtual interface selected based on the subset of the spatial variations of the landmark pattern that is occluded by the occlusion in the input image.

21. The method of claim 20, wherein the landmark pattern includes a Quick Response (QR) code.

22. The method of claim 20, further comprising:
identifying that the subset of the spatial variations of the landmark pattern are occluded by the occlusion based on a comparison between the landmark pattern as depicted in the input image and a reference instance of the landmark pattern.

23. The method of claim 20, further comprising:
generating at least a portion of the virtual interface.

24. The method of claim 20, further comprising:
receiving at least a portion of the virtual interface from a display device that includes the first display.

25. The method of claim 20, further comprising:
generating at least a portion of the output image.

26. The method of claim 25, wherein generating at least the portion of the output image includes modifying the virtual interface using a perspective distortion that is based on the pose of the landmark pattern in the input image.

27. The method of claim 20, further comprising:
generating landmark pattern data corresponding to the landmark pattern; and
sending the landmark pattern data to a display device that includes the first display for the display device to display the landmark pattern on the first display in response to receiving the landmark pattern data.

28. The method of claim 20, further comprising:
receiving, from a display device that includes the first display, a display interface input identifier indicative of a portion of the first display receiving a display interface input via a display interface of the display device, the display interface associated with the first display.

29. The method of claim 28, further comprising:
identifying that the portion of the first display indicated by the display interface input identifier aligns with a portion of the virtual interface in the output image.

30. The method of claim 20, further comprising:
determining a size of the first display in the input image, wherein a size of the virtual interface in the output image is based on the size of the first display in the input image.

* * * * *